· US012443635B1

(12) United States Patent
Wolff

(10) Patent No.: US 12,443,635 B1
(45) Date of Patent: Oct. 14, 2025

(54) SYSTEMS AND METHODS FOR AUTOMATED PROMPT GENERATION FOR INTELLIGENT ALERTING IN CONDITION MONITORING USING CONTEXTUAL LANGUAGE MODELS AND RETRIEVAL-AUGMENTED GENERATION

(71) Applicant: SAS Institute Inc., Cary, NC (US)

(72) Inventor: Mark A. Wolff, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/229,708

(22) Filed: Jun. 5, 2025

Related U.S. Application Data

(60) Provisional application No. 63/704,226, filed on Oct. 7, 2024.

(51) Int. Cl.
  *G06F 16/3329* (2025.01)
  *G06F 16/334* (2025.01)
(52) U.S. Cl.
  CPC ........ *G06F 16/3329* (2019.01); *G06F 16/334* (2019.01)
(58) Field of Classification Search
  CPC .................... G06F 16/3329; G06F 16/334
  See application file for complete search history.

(56) References Cited

U.S. PATENT DOCUMENTS

| | | | |
|---|---|---|---|
| 2021/0241884 A1* | 8/2021 | Swisher | G06V 10/82 |
| 2024/0402662 A1* | 12/2024 | Ramanasankaran | G05B 13/028 |
| 2025/0045256 A1* | 2/2025 | Gottlob | G06F 16/211 |
| 2025/0111095 A1* | 4/2025 | Lecroart | G06N 20/00 |
| 2025/0118066 A1* | 4/2025 | Hattori | G06F 40/40 |
| 2025/0147992 A1* | 5/2025 | Ding | G06F 16/345 |
| 2025/0194978 A1* | 6/2025 | Doyen | G16H 50/20 |
| 2025/0202762 A1* | 6/2025 | Izquierdo Franco | H04L 41/16 |

* cited by examiner

*Primary Examiner* — Eric Yen
(74) *Attorney, Agent, or Firm* — Padowithz Alce; Quintin Scheitlin; Alce PLLC

(57) ABSTRACT

A system, method, and computer-program product includes receiving a machine-generated alert indicating a data outlier for a physical asset; obtaining, from a computer database, a dataset including observed data for the physical asset within a predefined temporal window of the machine-generated alert; generating, via a description generator, a contextual description of the data outlier based at least on the observed data for the physical asset; searching an embedding-based knowledgebase for a subset of embedding representations of the plurality of embedding representations within a similarity threshold of an embedding representation of the contextual description; obtaining, from the computer database, a subset of the plurality of reference artifacts that correspond to the subset of embedding representations; and generating, via a large language model, a resolution suggestion for resolving the data outlier based at least on the subset of reference artifacts obtained from the computer database.

30 Claims, 23 Drawing Sheets

SYSTEMS AND METHODS FOR AUTOMATED PROMPT GENERATION FOR INTELLIGENT ALERTING IN CONDITION MONITORING USING CONTEXTUAL LANGUAGE MODELS AND RETRIEVAL-AUGMENTED GENERATION

CROSS-REFERENCE TO RELATED APPLICATIONS

This application claims the benefit of priority to U.S. Patent Application No. 63/704,226, filed on Oct. 7, 2024, incorporated herein by reference in its entirety for all purposes.

TECHNICAL FIELD

This invention relates generally to condition monitoring and, more specifically, to automated anomaly detection and resolution in telemetry-based monitoring systems.

BACKGROUND

Predictive maintenance refers to the process of identifying and addressing potential equipment failures before they occur. The goal of predictive maintenance is to reduce unplanned downtime, extend asset lifespan, and improve operational efficiency by enabling timely interventions. To support predictive maintenance, systems may continuously monitor telemetry data from physical assets, such as motors and pumps, to allow emerging faults to be detected early. For instance, such systems may collect telemetry data from one or more sensors that represent measurements captured over time and may analyze the measurements in order to identify anomalous behavior indicating degradation or failure of the physical asset.

Traditional monitoring systems may rely on static threshold-based rules or manual diagnostics to detect anomalies. However, such techniques may fail to capture complex, multivariate patterns that precede faults, potentially leading to missed detections or delayed maintenance. Additionally, as the number of sensors and measurable parameters increases, the volume and complexity of the data may increase such that manual inspection and rule-based monitoring may become prohibitive (e.g., may fail to satisfy latency constraints without additional computational and/or memory resources than what is allocated for the monitoring system). The present disclosure may describe systems and methods that generate contextual descriptions of anomalies and resolution suggestions using statistical analysis, machine learning, and language models to improve the accuracy, explainability, and operational utility of real-time asset monitoring.

BRIEF SUMMARY OF THE EMBODIMENTS

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In some embodiments, a computer-program product comprising a non-transitory machine-readable storage medium may store computer instructions that, when executed by one or more processors, perform operations comprising: receiving a machine-generated alert indicating a data outlier for a physical asset; obtaining, from a computer database, a dataset comprising observed data for the physical asset within a predefined temporal window of the machine-generated alert; generating, via a description generator, a contextual description of the data outlier based at least on the observed data for the physical asset; in response to generating the contextual description of the data outlier, searching an embedding-based knowledgebase that comprises a plurality of embedding representations corresponding to a plurality of reference artifacts for the physical asset, wherein searching the embedding-based knowledgebase includes: computing, via an embedding model, an embedding representation of the contextual description generated for the data outlier, and detecting a subset of embedding representations of the plurality of embedding representations within a similarity threshold of the embedding representation of the contextual description; obtaining, from the computer database, a subset of the plurality of reference artifacts that correspond to the subset of embedding representations; and generating, via a large language model, a resolution suggestion for resolving the data outlier based at least on the subset of reference artifacts obtained from the computer database.

In some embodiments of the computer-program product, the observed data for the physical asset includes a plurality of measurement values for a plurality of measuring devices during the predefined temporal window, and generating the contextual description of the data outlier includes: detecting, via the description generator, that a respective measurement value of the plurality of measurement values satisfies condition criteria of a pre-defined measurement exception rule, and prompting the large language model to generate the contextual description of the data outlier based on: the observed data for the physical asset, the condition criteria and a corrective action associated with the pre-defined measurement exception rule, and one or more identifying attributes of the physical asset and a measuring device associated with the respective measurement value.

In some embodiments of the computer-program product, the contextual description generated for the data outlier includes one or more sentences that: identify the physical asset, describe a condition of the physical asset resulting from the data outlier, provide a measurement value associated with the data outlier relative to a predefined measurement condition criterion, specify a cause of the data outlier, specify a corrective action associated with the data outlier, and suggest one or more types of reference artifacts to retrieve for the data outlier.

In some embodiments of the computer-program product, the one or more sentences specifying the cause of the data outlier: indicate that the cause of the data outlier has been previously observed when the description generator identifies that a pre-defined measurement exception rule is associated with the data outlier, and indicate that a cause of the data outlier is unknown when the description generator identifies that no pre-defined measurement exception rule is associated with the data outlier.

In some embodiments of the computer-program product, the observed data for the physical asset includes a plurality of measurement values for a plurality of measuring devices during the predefined temporal window, and generating the contextual description of the data outlier includes: detecting, via the description generator, that the plurality of measurement values do not satisfy condition criteria of a plurality of pre-defined measurement exception rules, and in response to detecting that the plurality of measurement values do not satisfy the condition criteria of the plurality of pre-defined measurement exception rules: detecting, via a correlation analysis, a subset of the plurality of measuring devices that exhibit a correlation coefficient exceeding a predefined threshold, and prompting the large language model to generate the contextual description of the data outlier based on: the observed data for the physical asset, the subset of the plurality of measuring devices that exhibit the correlation coefficient exceeding the predefined threshold, and one or more identifying attributes of the physical asset and the subset of measuring devices.

In some embodiments of the computer-program product, the observed data for the physical asset includes a plurality of measurement values for a plurality of measuring devices during the predefined temporal window, and generating the contextual description of the data outlier includes: detecting, via the description generator, that the plurality of measurement values do not satisfy condition criteria of a plurality of pre-defined measurement exception rules, detecting, via a correlation analysis, that the plurality of measuring devices do not include a set of measuring devices that exhibit a correlation coefficient exceeding a predefined threshold, and in response to detecting that the plurality of measurement values do not satisfy the condition criteria of the plurality of pre-defined measurement exception rules and that the plurality of measuring devices do not include the set of measuring devices that exhibit the correlation coefficient exceeding the predefined threshold: detecting, via a machine learning model, one or more measuring devices of the plurality of measuring devices that have a prediction contribution value exceeding a predefined contribution significance threshold, and prompting the large language model to generate the contextual description of the data outlier based on: the observed data for the physical asset, the one or more measuring devices that that have the prediction contribution value exceeding the predefined contribution significance threshold, and one or more identifying attributes of the physical asset and the one or more measuring devices.

In some embodiments of the computer-program product, the description generator detected that a respective measurement value in the observed data for the physical asset satisfied condition criteria of a pre-defined measurement exception rule, a set of measurement values associated with a first plurality of reference artifacts of the plurality of reference artifacts satisfy the condition criteria of the pre-defined measurement exception rule, and a set of measurement values associated with a second plurality of reference artifacts of the plurality of reference artifacts do not satisfy the condition criteria of the pre-defined measurement exception rule, and detecting the subset of embedding representations within the similarity threshold of the embedding representation of the contextual description includes: detecting the subset of embedding representations from a set of embedding representations corresponding to the first plurality of reference artifacts, and forgoing detecting the subset of embedding representations from a set of embedding representations corresponding to the second plurality of reference artifacts.

In some embodiments of the computer-program product, the physical asset is associated with a plurality of measuring devices, and the machine-generated alert does not indicate which of the plurality of measuring devices are causing the data outlier.

In some embodiments of the computer-program product, the data outlier is detected by an outlier detection model that receives a real-time stream of measurement values from the physical asset, and the outlier detection model is trained on nominal historical measurement values associated with the physical asset to establish a baseline nominal operating range for the real-time stream of measurement values.

In some embodiments of the computer-program product, the physical asset is associated with a plurality of measuring devices, and the baseline nominal operating range for the real-time stream of measurement values includes one or more of: one or more measuring device-specific nominal operating ranges for one or more of the plurality of measuring devices, and one or more multi-measuring device nominal operating ranges for two or more of the plurality of measuring devices.

In some embodiments of the computer-program product, the observed data for the physical asset includes a plurality of measurement values for a plurality of measuring devices during the predefined temporal window, and generating the contextual description of the data outlier includes: detecting, via the description generator, that a respective measurement value of the plurality of measurement values satisfies condition criteria of a plurality of pre-defined measurement exception rules, ranking, via the description generator, a plurality of corrective actions associated with the plurality of pre-defined measurement exception rules based on a measurement value of at least one additional measuring device of the plurality of measuring devices, selecting, via the description generator, a most probable corrective action for the data outlier based on the ranking of the plurality of corrective actions, and prompting the large language model to generate the contextual description of the data outlier based at least on: a first pre-defined measurement exception rule of the plurality of pre-defined measurement exception rules when the most probable corrective action corresponds to the first pre-defined measurement exception rule, and a second pre-defined measurement exception rule of the plurality of pre-defined measurement exception rules when the most probable corrective action corresponds to the second pre-defined measurement exception rule.

In some embodiments of the computer-program product, a respective reference artifact of the plurality of reference artifacts corresponds to a historical data outlier and includes: a set of measurement values observed during the historical data outlier, an identified cause of the historical data outlier, and a corrective action performed to resolve the historical data outlier associated with the physical asset.

In some embodiments of the computer-program product, a respective reference artifact of the plurality of reference artifacts corresponds to one of: a historical operational record, a procedural guideline, a diagnostic reference, an analytical case study, and a component specification document.

In some embodiments of the computer-program product, the computer instructions, when executed by the one or more processors, perform operations further comprising: receiving, via an interface, a user request to log an outcome of the resolution suggestion to the computer database, and in response to receiving the user request: creating, at the computer database, a new reference artifact that associates the data outlier with the outcome of the resolution suggestion, and refining, via a feedback loop, the description generator using the new reference artifact.

In some embodiments of the computer-program product, the embedding model is a machine learning model configured to encode input data into a numerical representation within a multi-dimensional space and the embedding representation of the contextual description numerically encodes the contextual description as a set of numerical features, wherein the set of numerical features corresponds to a dimensionality of the multi-dimensional space.

In some embodiments of the computer-program product, the computer instructions, when executed by the one or more processors, perform operations further comprising: transmitting a real-time notification to an electronic device indicating the data outlier associated with the physical asset and the resolution suggestion for resolving the data outlier.

In some embodiments of the computer-program product, the computer instructions, when executed by the one or more processors, perform operations further comprising: displaying a real-time user interface indicating the data outlier associated with the physical asset and the resolution suggestion for resolving the data outlier.

In some embodiments, a computer-implemented method may comprise: receiving a machine-generated alert indicating a data outlier for a physical asset; obtaining, from a computer database, a dataset comprising observed data for the physical asset within a predefined temporal window of the machine-generated alert; generating, via a description generator, a contextual description of the data outlier based at least on the observed data for the physical asset; in response to generating the contextual description of the data outlier, searching an embedding-based knowledgebase that comprises a plurality of embedding representations corresponding to a plurality of reference artifacts for the physical asset, wherein searching the embedding-based knowledgebase includes: computing, via an embedding model, an embedding representation of the contextual description generated for the data outlier, and detecting a subset of embedding representations of the plurality of embedding representations within a similarity threshold of the embedding representation of the contextual description; obtaining, from the computer database, a subset of the plurality of reference artifacts that correspond to the subset of embedding representations; and generating, via a large language model, a resolution suggestion for resolving the data outlier based at least on the subset of reference artifacts obtained from the computer database.

In some embodiments of the computer-implemented method: the observed data for the physical asset includes a plurality of measurement values for a plurality of measuring devices during the predefined temporal window, and generating the contextual description of the data outlier includes: detecting, via the description generator, that a respective measurement value of the plurality of measurement values satisfies condition criteria of a pre-defined measurement exception rule, and prompting the large language model to generate the contextual description of the data outlier based on: the observed data for the physical asset, the condition criteria and a corrective action associated with the pre-defined measurement exception rule, and one or more identifying attributes of the physical asset and a measuring device associated with the respective measurement value.

In some embodiments of the computer-implemented method: the contextual description generated for the data outlier includes one or more sentences that: identify the physical asset, describe a condition of the physical asset resulting from the data outlier, provide a measurement value associated with the data outlier relative to a predefined measurement condition criterion, specify a cause of the data outlier, specify a corrective action associated with the data outlier, and suggest one or more types of reference artifacts to retrieve for the data outlier.

In some embodiments of the computer-implemented method: the one or more sentences specifying the cause of the data outlier: indicate that the cause of the data outlier has been previously observed when the description generator identifies that a pre-defined measurement exception rule is associated with the data outlier, and indicate that a cause of the data outlier is unknown when the description generator identifies that no pre-defined measurement exception rule is associated with the data outlier.

In some embodiments of the computer-implemented method: the observed data for the physical asset includes a plurality of measurement values for a plurality of measuring devices during the predefined temporal window, and generating the contextual description of the data outlier includes: detecting, via the description generator, that the plurality of measurement values do not satisfy condition criteria of a plurality of pre-defined measurement exception rules, and in response to detecting that the plurality of measurement values do not satisfy the condition criteria of the plurality of pre-defined measurement exception rules: detecting, via a correlation analysis, a subset of the plurality of measuring devices that exhibit a correlation coefficient exceeding a predefined threshold, and prompting the large language model to generate the contextual description of the data outlier based on: the observed data for the physical asset, the subset of the plurality of measuring devices that exhibit the correlation coefficient exceeding the predefined threshold, and one or more identifying attributes of the physical asset and the subset of measuring devices.

In some embodiments of the computer-implemented method: the observed data for the physical asset includes a plurality of measurement values for a plurality of measuring devices during the predefined temporal window, and generating the contextual description of the data outlier includes: detecting, via the description generator, that the plurality of measurement values do not satisfy condition criteria of a plurality of pre-defined measurement exception rules, detecting, via a correlation analysis, that the plurality of measuring devices do not include a set of measuring devices that exhibit a correlation coefficient exceeding a predefined threshold, and in response to detecting that the plurality of measurement values do not satisfy the condition criteria of the plurality of pre-defined measurement exception rules and that the plurality of measuring devices do not include the set of measuring devices that exhibit the correlation coefficient exceeding the predefined threshold: detecting, via a machine learning model, one or more measuring devices of the plurality of measuring devices that have a prediction contribution value exceeding a predefined contribution significance threshold, and prompting the large language model to generate the contextual description of the data outlier based on: the observed data for the physical asset, the one or more measuring devices that that have the prediction contribution value exceeding the predefined contribution significance threshold, and one or more identifying attributes of the physical asset and the one or more measuring devices.

In some embodiments of the computer-implemented method: the description generator detected that a respective measurement value in the observed data for the physical asset satisfied condition criteria of a pre-defined measurement exception rule, a set of measurement values associated with a first plurality of reference artifacts of the plurality of reference artifacts satisfy the condition criteria of the pre-defined measurement exception rule, and a set of measurement values associated with a second plurality of reference artifacts of the plurality of reference artifacts do not satisfy the condition criteria of the pre-defined measurement exception rule, and detecting the subset of embedding representations within the similarity threshold of the embedding representation of the contextual description includes: detecting the subset of embedding representations from a set of embedding representations corresponding to the first plurality of reference artifacts, and forgoing detecting the subset of embedding representations from a set of embedding representations corresponding to the second plurality of reference artifacts.

In some embodiments of the computer-implemented method: the physical asset is associated with a plurality of measuring devices, and the machine-generated alert does not indicate which of the plurality of measuring devices are causing the data outlier.

In some embodiments of the computer-implemented method: the data outlier is detected by an outlier detection model that receives a real-time stream of measurement values from the physical asset, and the outlier detection model is trained on nominal historical measurement values associated with the physical asset to establish a baseline nominal operating range for the real-time stream of measurement values.

In some embodiments of the computer-implemented method: the physical asset is associated with a plurality of measuring devices, and the baseline nominal operating range for the real-time stream of measurement values includes one or more of: one or more measuring device-specific nominal operating ranges for one or more of the plurality of measuring devices, and one or more multi-measuring device nominal operating ranges for two or more of the plurality of measuring devices.

In some embodiments of the computer-implemented method, the observed data for the physical asset includes a plurality of measurement values for a plurality of measuring devices during the predefined temporal window, and generating the contextual description of the data outlier includes: detecting, via the description generator, that a respective measurement value of the plurality of measurement values satisfies condition criteria of a plurality of pre-defined measurement exception rules, ranking, via the description generator, a plurality of corrective actions associated with the plurality of pre-defined measurement exception rules based on a measurement value of at least one additional measuring device of the plurality of measuring devices, selecting, via the description generator, a most probable corrective action for the data outlier based on the ranking of the plurality of corrective actions, and prompting the large language model to generate the contextual description of the data outlier based at least on: a first pre-defined measurement exception rule of the plurality of pre-defined measurement exception rules when the most probable corrective action corresponds to the first pre-defined measurement exception rule, and a second pre-defined measurement exception rule of the plurality of pre-defined measurement exception rules when the most probable corrective action corresponds to the second pre-defined measurement exception rule.

In some embodiments of the computer-implemented method: a respective reference artifact of the plurality of reference artifacts corresponds to a historical data outlier and includes: a set of measurement values observed during the historical data outlier, an identified cause of the historical data outlier, and a corrective action performed to resolve the historical data outlier associated with the physical asset.

In some embodiments, a computer-implemented system may comprise: one or more processors; a memory; and a computer-readable medium operably coupled to the one or more processors, the computer-readable medium having computer-readable instructions stored thereon that, when executed by the one or more processors, cause a computing device to perform operations comprising: receiving a machine-generated alert indicating a data outlier for a physical asset; obtaining, from a computer database, a dataset comprising observed data for the physical asset within a predefined temporal window of the machine-generated alert; generating, via a description generator, a contextual description of the data outlier based at least on the observed data for the physical asset; in response to generating the contextual description of the data outlier, searching an embedding-based knowledgebase that comprises a plurality of embedding representations corresponding to a plurality of reference artifacts for the physical asset, wherein searching the embedding-based knowledgebase includes: computing, via an embedding model, an embedding representation of the contextual description generated for the data outlier, and detecting a subset of embedding representations of the plurality of embedding representations within a similarity threshold of the embedding representation of the contextual description; obtaining, from the computer database, a subset of the plurality of reference artifacts that correspond to the subset of embedding representations; and generating, via a large language model, a resolution suggestion for resolving the data outlier based at least on the subset of reference artifacts obtained from the computer database.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

Figure 1:
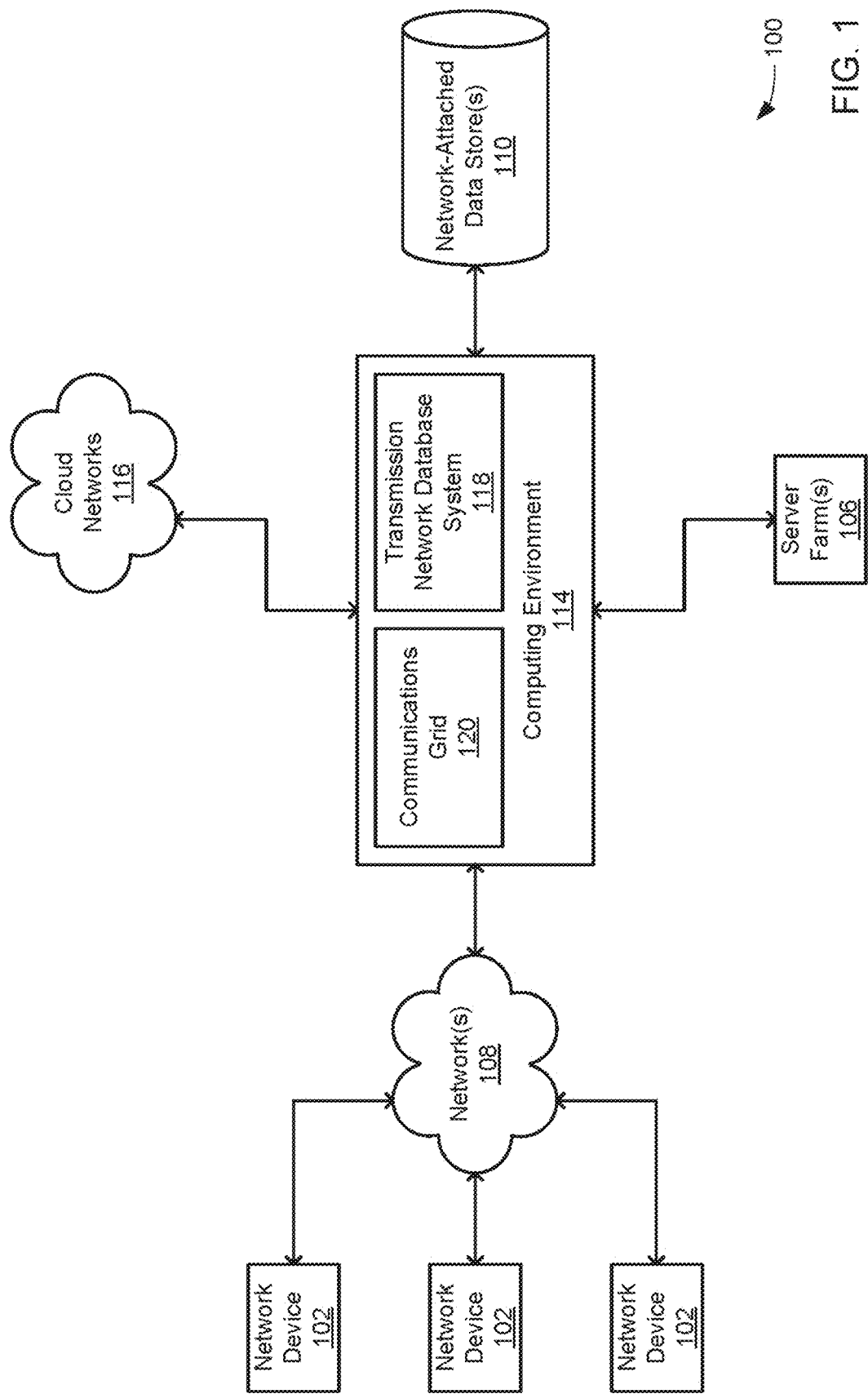
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
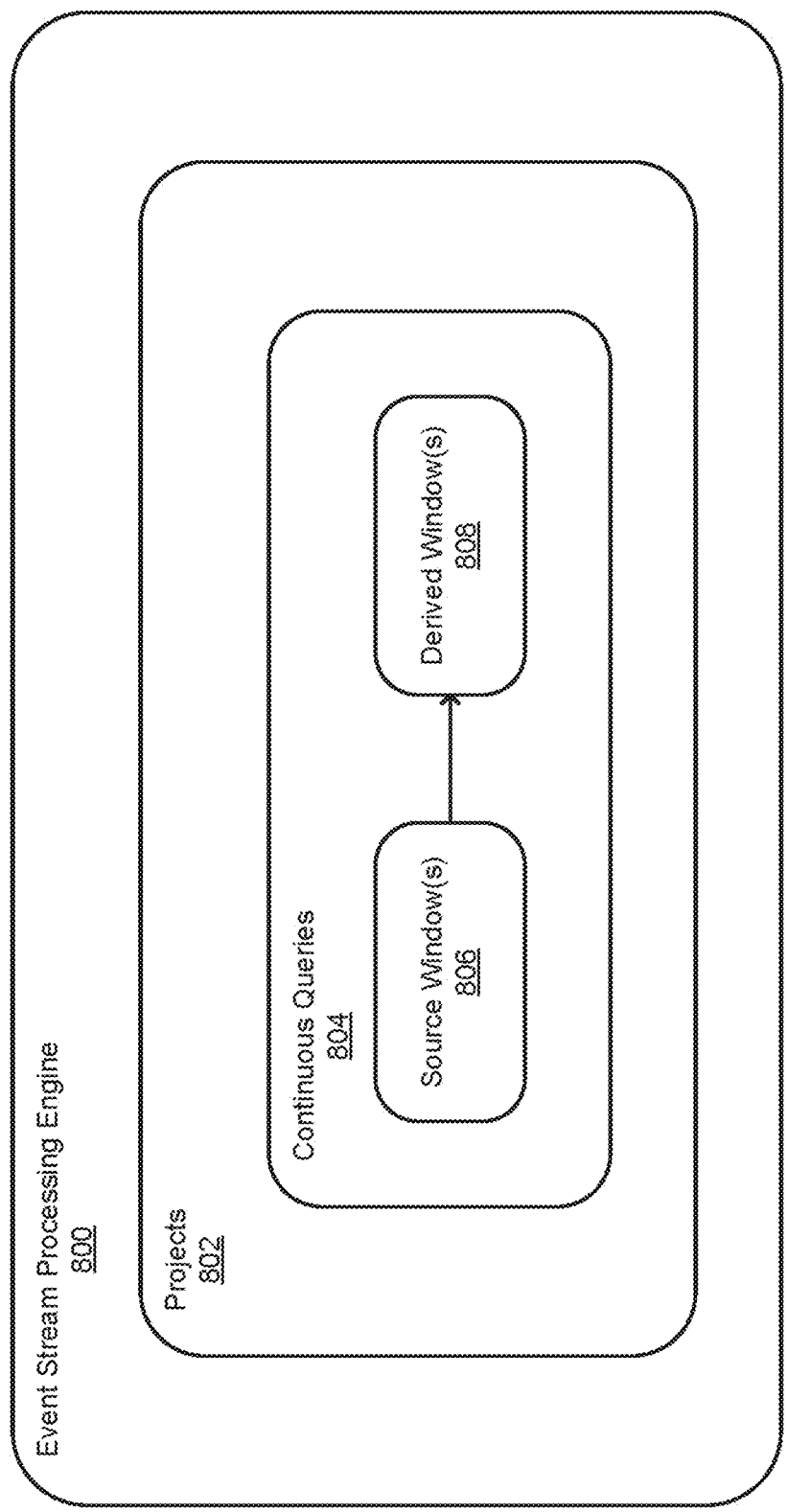
FIG. 8 illustrates a block diagram including components of an Event Stream Processing Engine (ESPE), according to some embodiments of the present technology.
Figure 9:
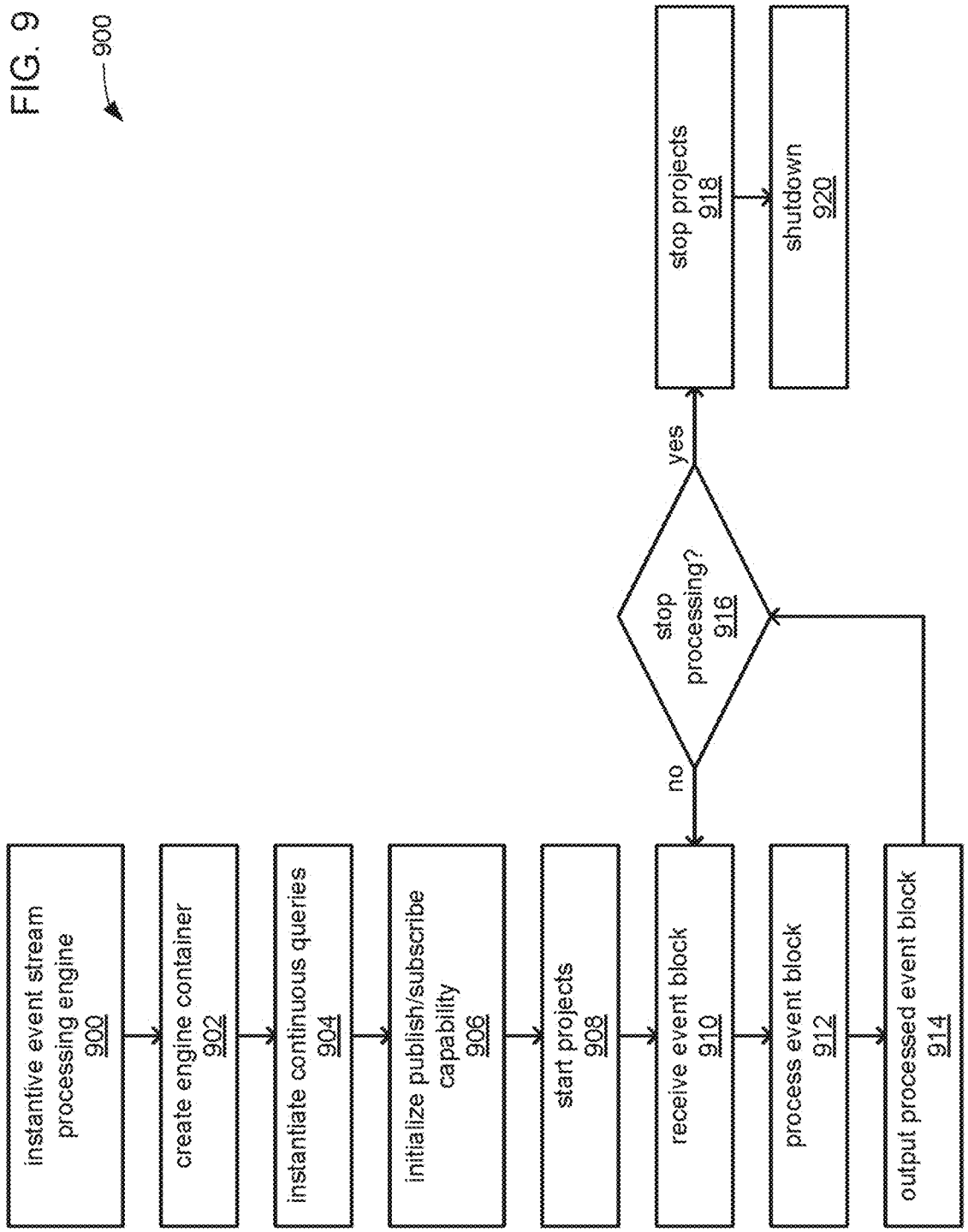
FIG. 9 illustrates a flow chart showing an example process including operations performed by an event stream processing engine, according to some embodiments of the present technology.
Figure 10:
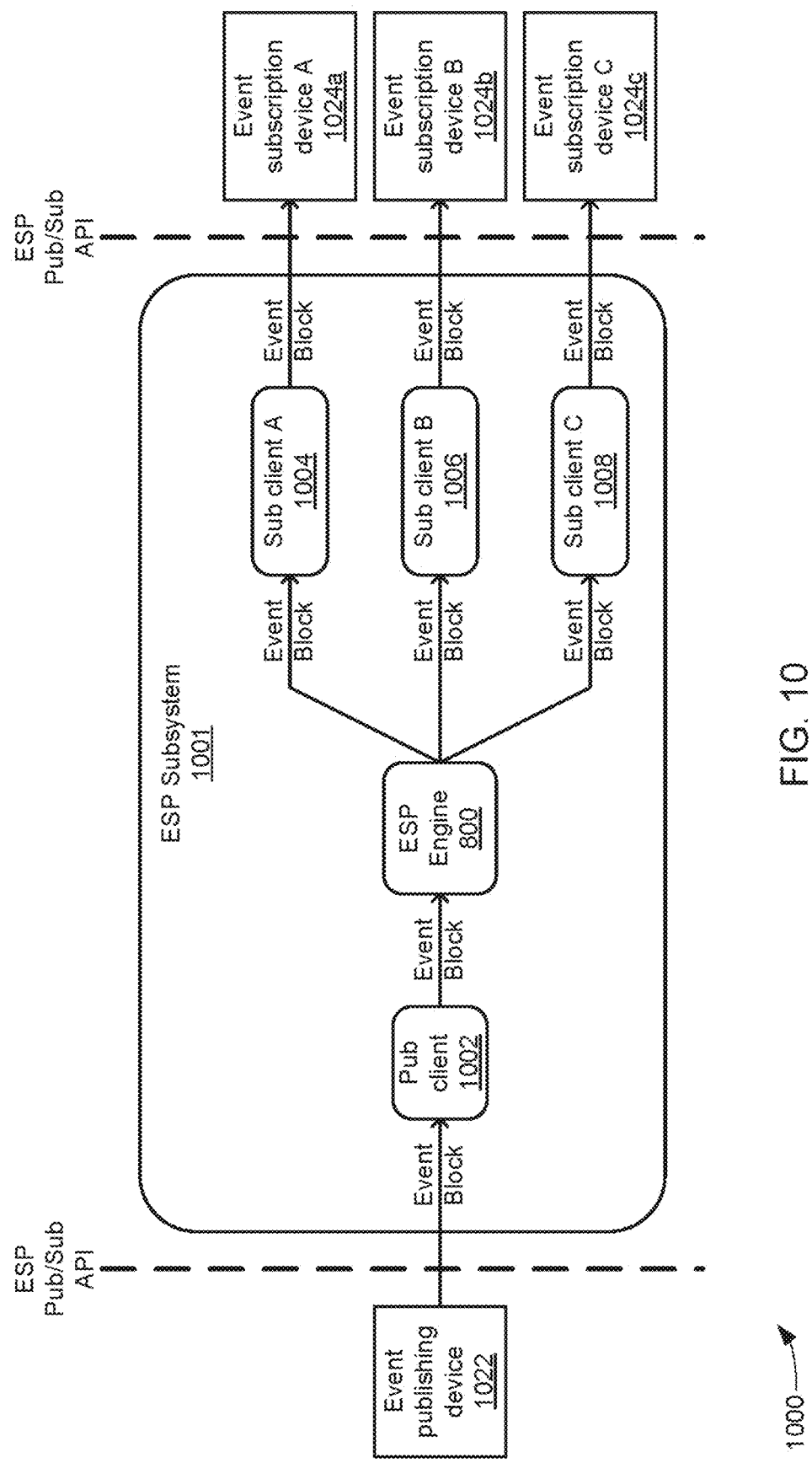
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
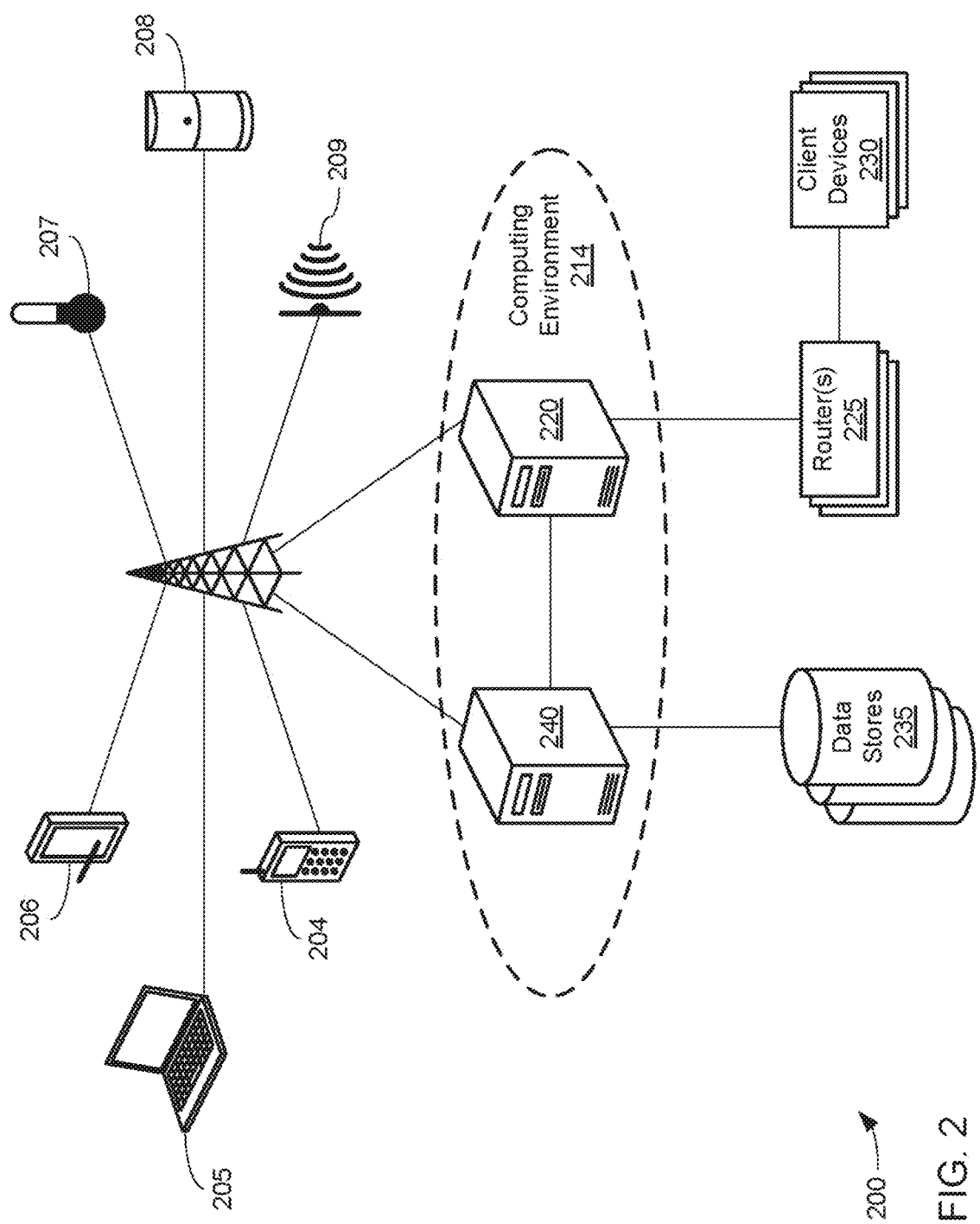
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
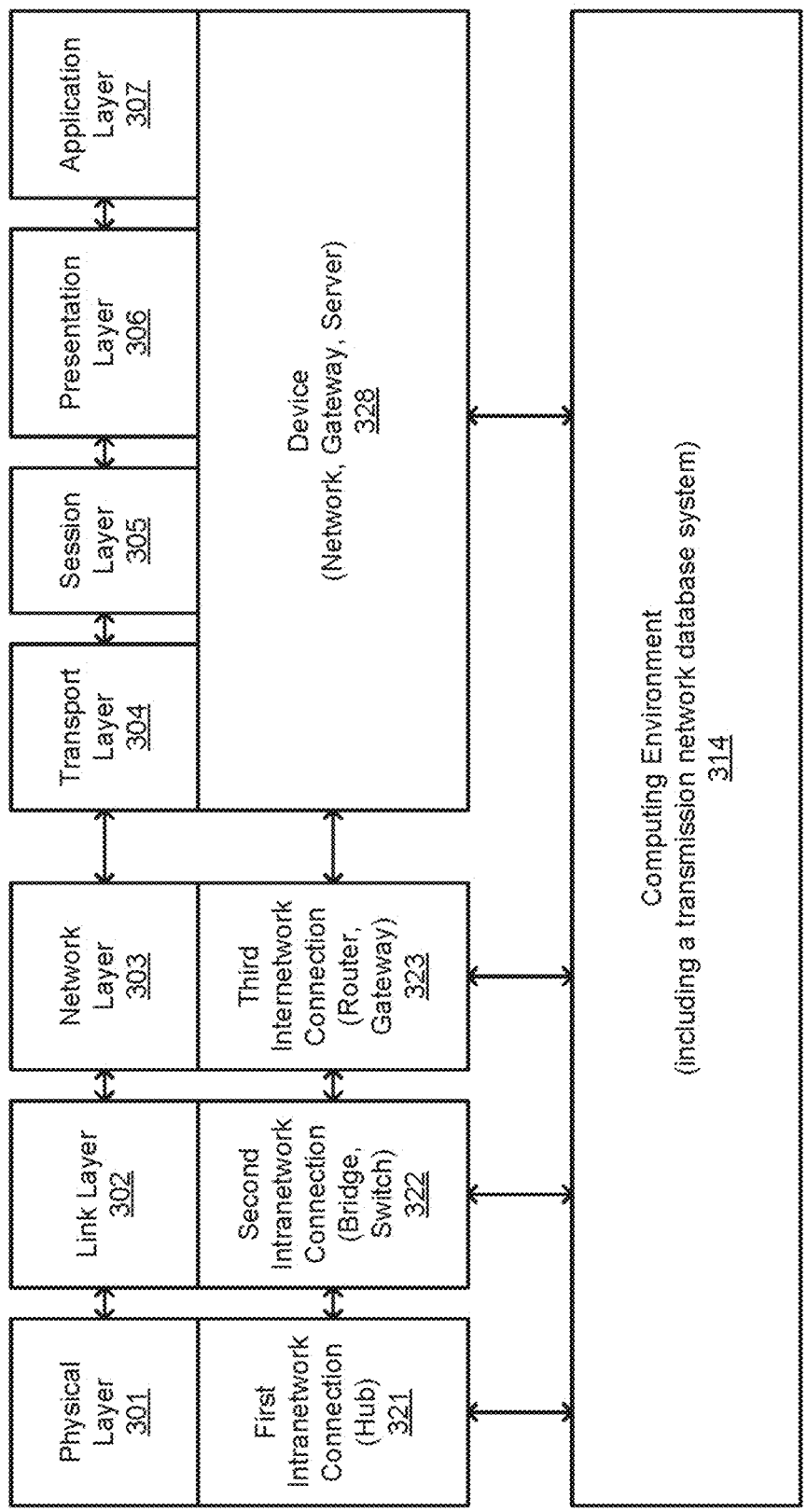
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 301. Physical layer 301 represents physical communication and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
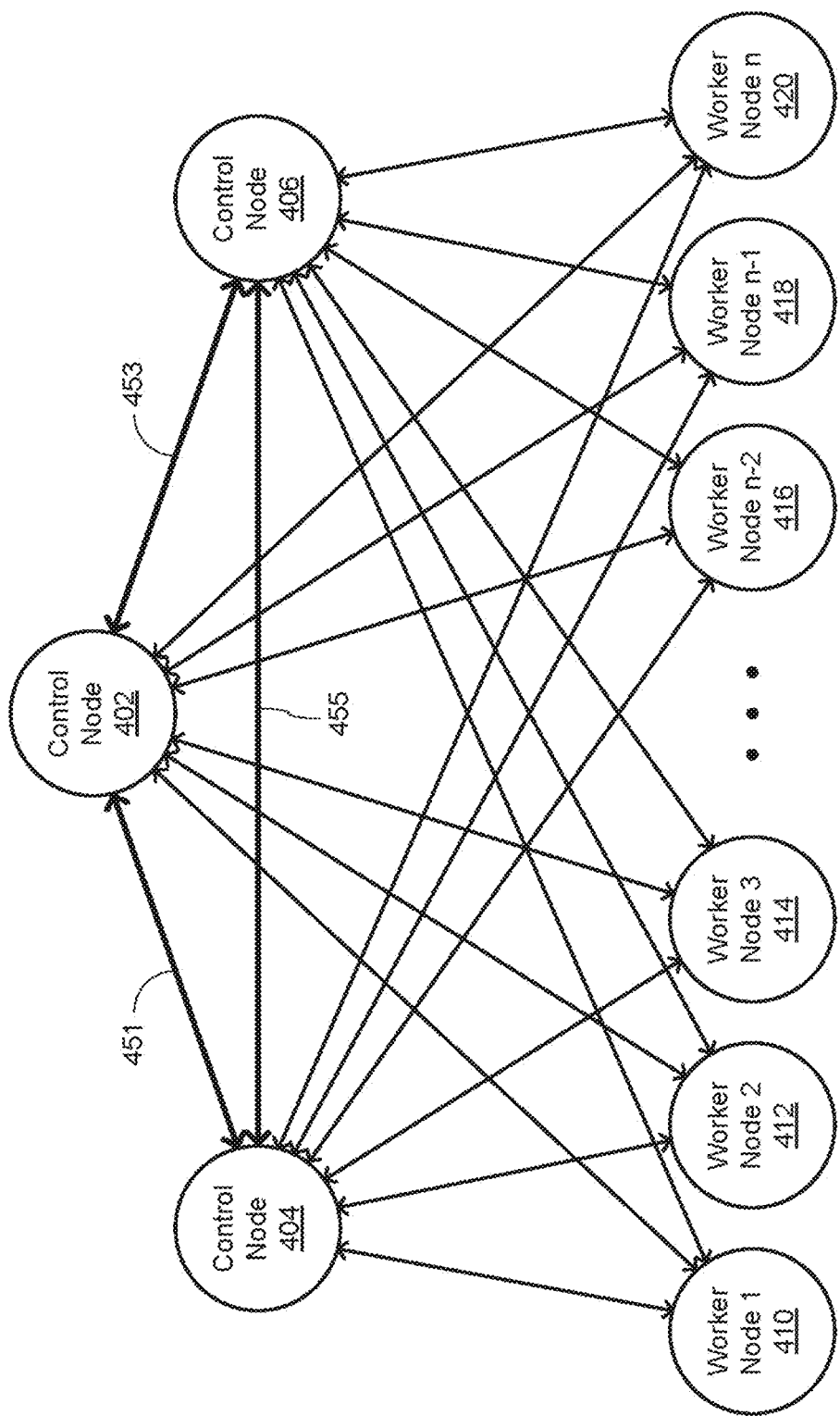
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recently saved checkpoint of their status and re-start the project from that checkpoint to minimize lost progress on the project being executed.

Figure 5:
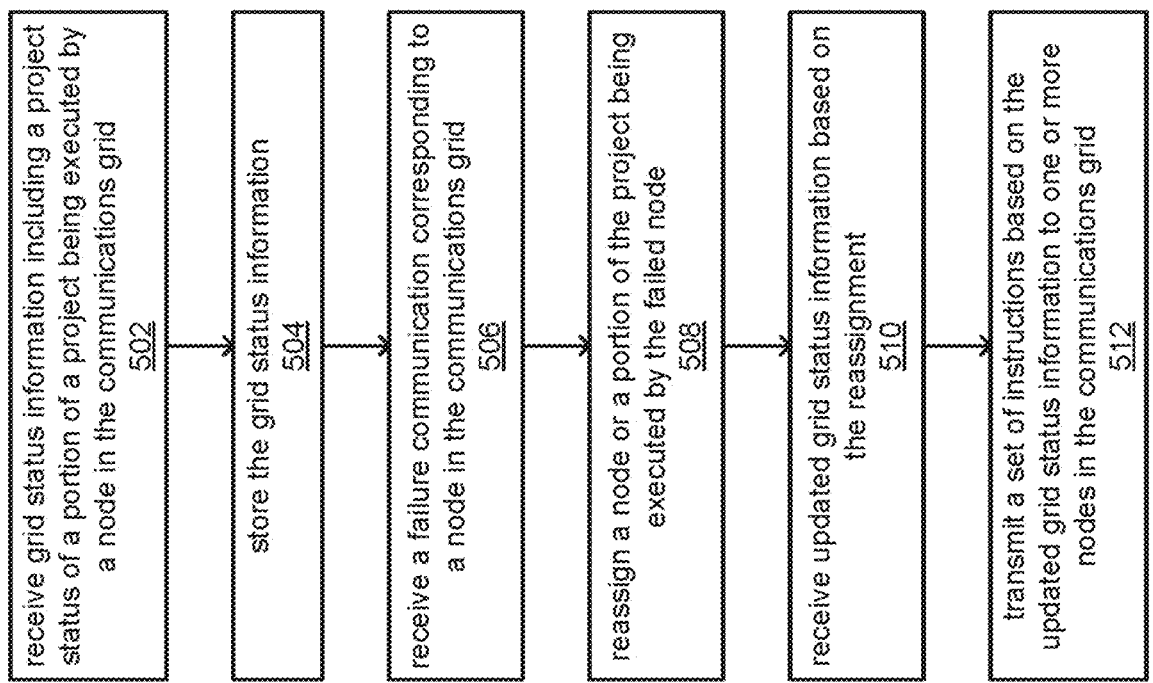
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
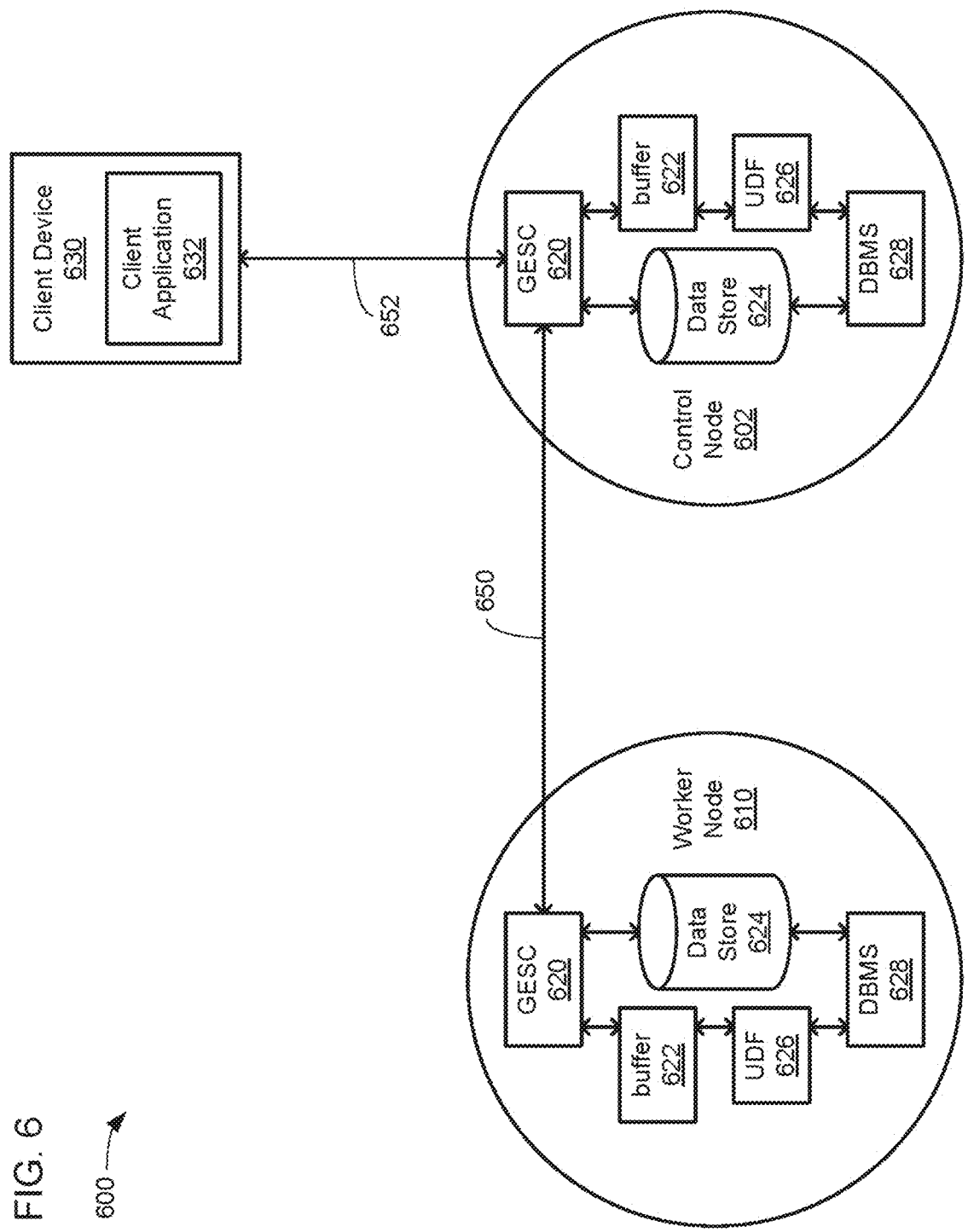
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
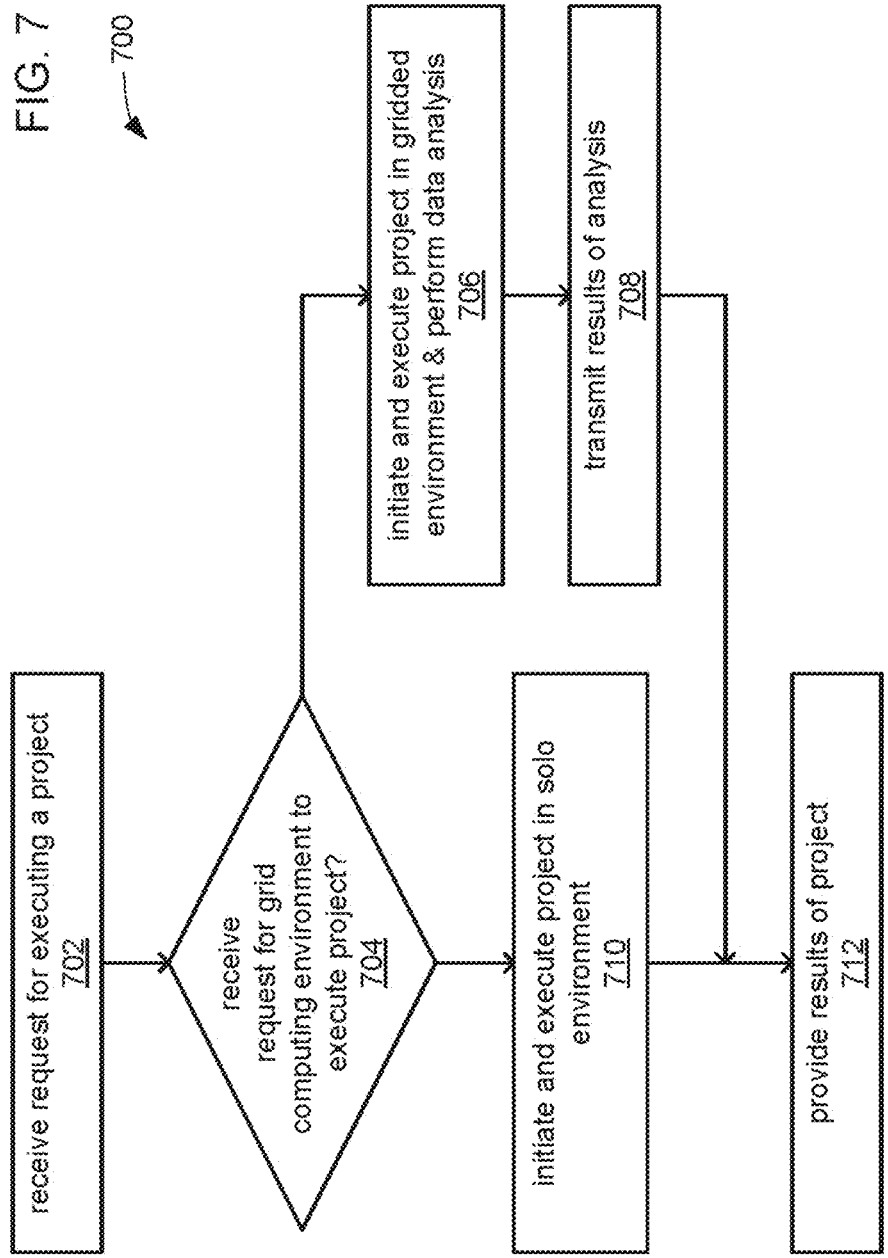
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Clients or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing devices of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
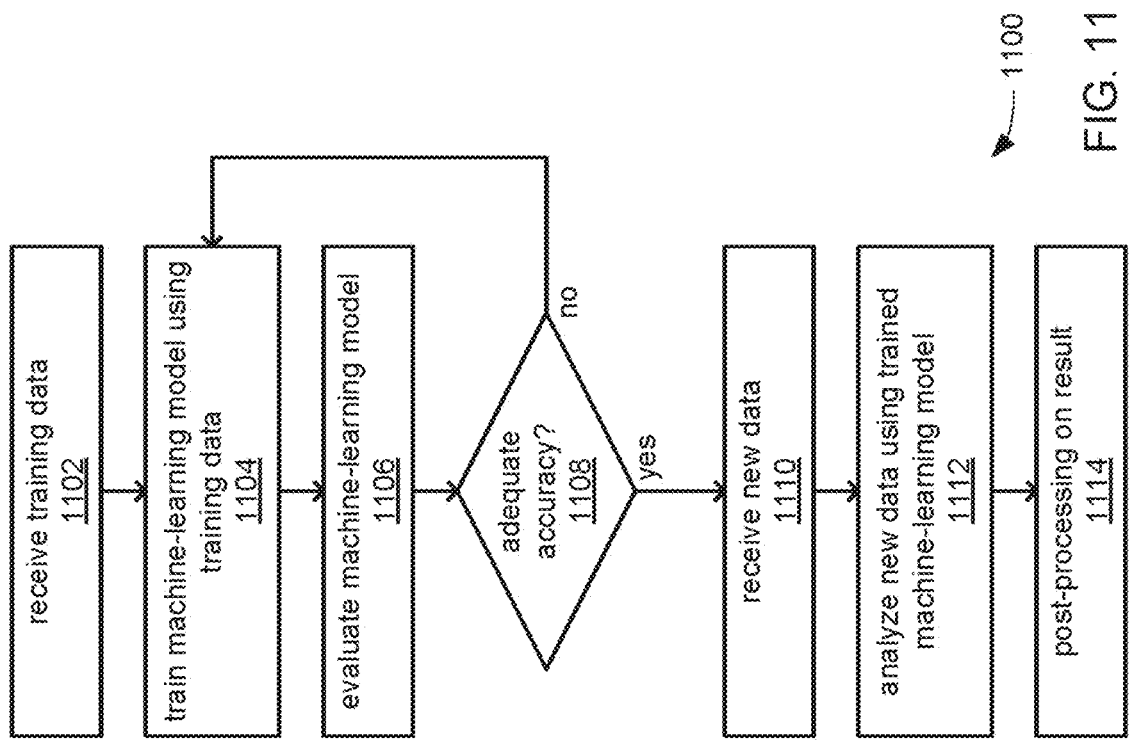
FIG. 11 illustrates a flow chart of an example of a process for generating and using a machine-learning model according to some aspects, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
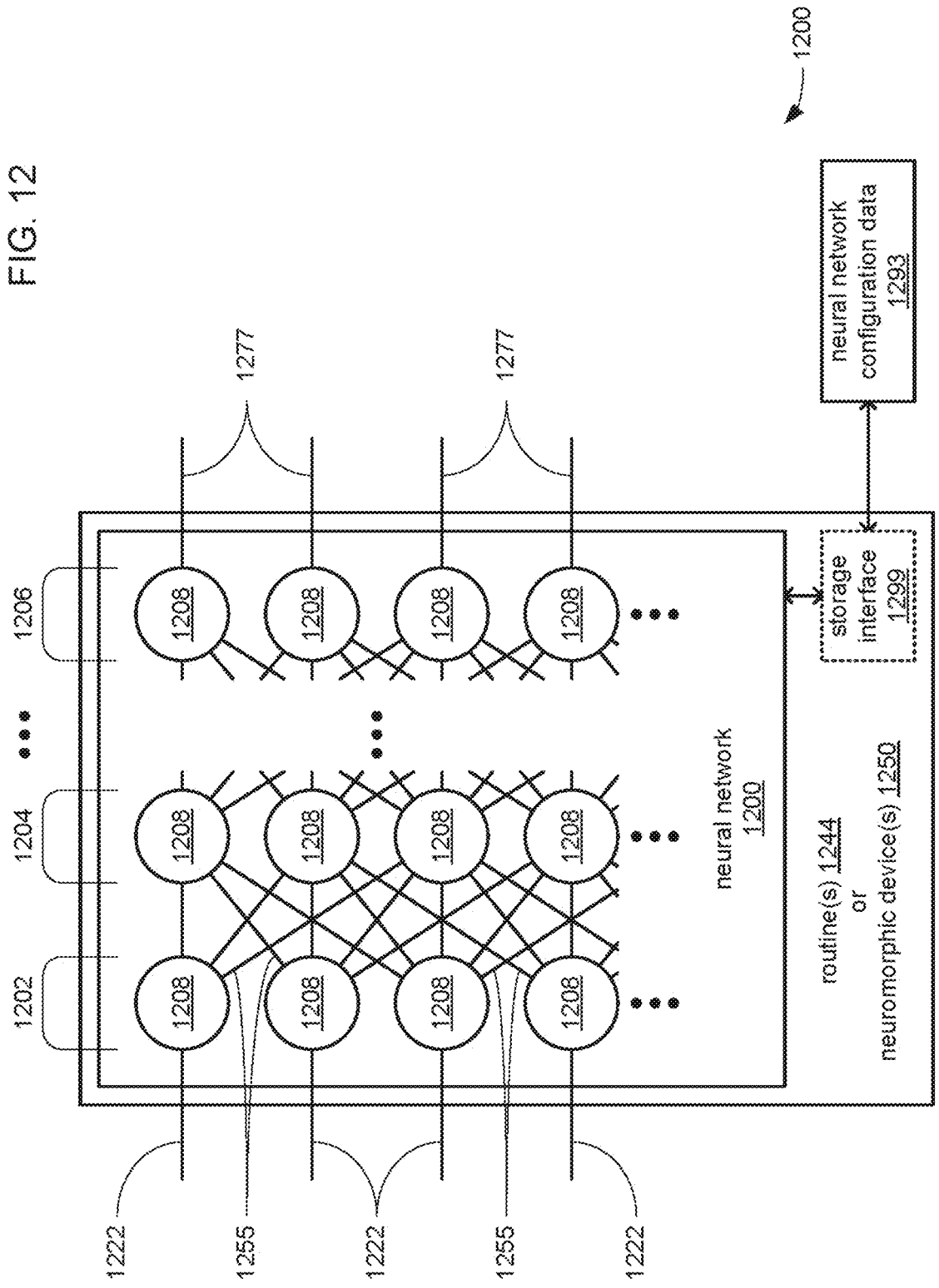
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y = \max(x, o)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
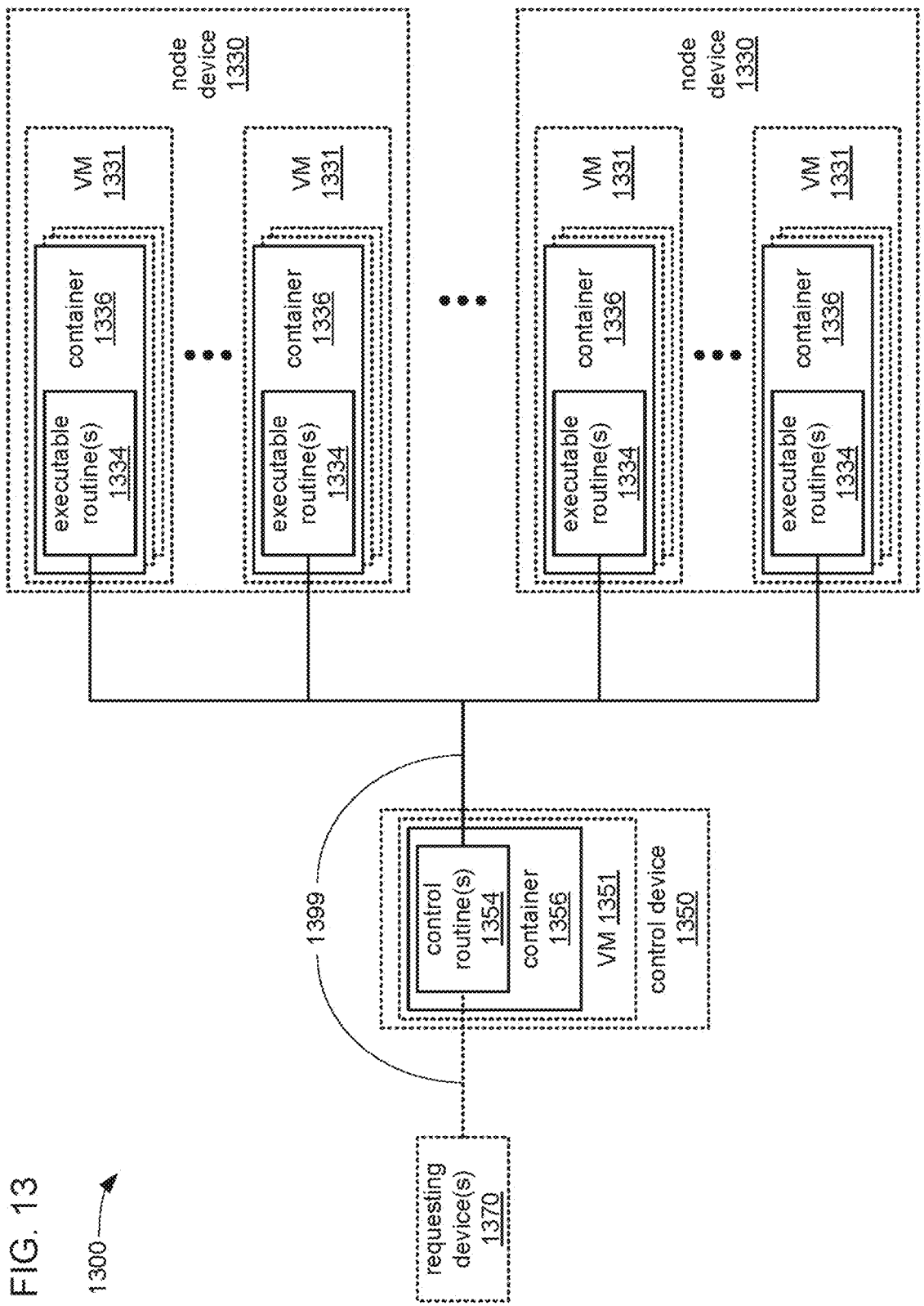
FIG. 13 illustrates various aspects of the use of containers as a mechanism to allocate processing, storage and/or other resources of a processing system to the performance of various analyses, according to some embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

In modern manufacturing environments, the operation of physical assets (e.g., motors, pumps, compressors, turbines, mechanical subassemblies), may be continuously monitored using streams of measurement values received from multiple measuring devices or sensors. These measuring devices may capture real-time telemetry data analyzed to identify anomalous patterns that precede or indicate equipment failure. However, traditional monitoring systems may rely on techniques such as manual inspections, static threshold alerts, or reactive diagnostics and may fail to detect at least some anomalies, such as those that involve complex, multivariate interactions or those that fall outside the scope of predefined rule sets. As such, at least some failure modes may go unnoticed during operation of the physical assets, thereby increasing the risk of undetected degradation or unexpected failure.

When anomalies are not detected in a timely or accurate manner, manufacturing operations may become increasingly vulnerable to process degradation, product defects, or unplanned downtime. For example, a small misalignment in a motor shaft may cause a gradual increase in torque and vibration that does not exceed any predefined threshold but may still signal the onset of mechanical failure for the motor. If this misalignment is not detected, the motor may fail and manufacturing of the product may cease until the motor is repaired or replaced. Alternatively, even in examples in which the motor may not fail, the misalignment in the motor shaft may introduce defects into the product. Systems that depend solely on static alerts or predefined heuristics may be insufficient to identify such conditions or recommend appropriate actions.

Additionally, as the number of measurable parameters received across physical assets increases, the corresponding datasets may also increase in dimensionality (e.g., may gain additional columns corresponding to the new measurable parameters). In such examples, techniques that rely on manual inspection (e.g., root cause analysis) and predefined rule sets may increasingly fail to capture a total number of occurring anomalies or may fail to do so in a way that enables anomalies to be detected in real-time or near real-time (e.g., may increase latency beyond a predefined threshold).

The techniques described herein address these and other limitations by introducing a system capable of performing automated detection of anomalies. For instance, upon receiving a machine-generated alert or detecting an outlier in one or more sensor readings, the system described herein may apply rule-based, statistical, and machine learning techniques (e.g., time series analysis, regression methods, clustering, complex event processing (CEP)) to determine whether the observed outlier constitutes a true anomaly. For instance, the system may determine whether the observed data satisfies predefined exception rules, exhibits high correlation among specific sensor groups, or has patterns that contribute significantly to anomaly detection models. The system may then generate an alert that includes a contextual description of the anomaly and one or more candidate causes and corrective actions.

In order to support continuous monitoring for and real-time analysis of anomalies, the system may include a data ingestion pipeline that continuously collects real-time asset telemetry data through the sensors or measuring devices and provides it to the system, where the data ingestion pipeline is scalable to accommodate high-frequency data inputs. It should be noted that the system may incorporate additional sources of data along with data from the measuring devices or sensors, such as historical maintenance records (e.g., maintenance logs), operator notes, and downtime history.

In addition to improving anomaly detection capabilities, the techniques described herein may also provide insight into the likely cause of a data outlier and may further generate actionable recommendations for addressing the identified condition. Traditional monitoring systems, even if capable of flagging anomalies associated with complex or interdependent measurements, may fail to provide an accurate indication of why the anomalies have occurred or how to address them, delaying associated corrective procedures.

In contrast, the system described herein may generate contextual descriptions using one or more custom-trained language models (e.g., large language models (LLMs)) that provide context for anomalies and the actions that may be taken to address them. Each contextual description may include, for example, a probable cause (e.g., contextualized based on prior incidents), an impact analysis estimating potential effects on operations, and recommended corrective actions (e.g., recommended maintenance actions). The language models may be trained on one or more of historical fault data, equipment specifications, and operational logs.

Using the one or more language models, the system may generate a contextual description of an anomaly from the observed telemetry data and may transform the contextual description into a vector representation used to query an embedding-based knowledgebase populated with contextual relevant reference artifacts (e.g., documentation associated with previous data outliers and corresponding resolutions). Based on the retrieved reference artifacts, a language model may generate a resolution suggestion that includes a hypothesized cause of the anomaly and a recommended corrective action. The resolution suggestion may then be included in the alert. The resolution suggestion including the cause of the anomaly as well as a corresponding corrective action may enable the anomaly to be addressed as soon as the alert is received. In some examples, the system may include a feedback mechanism in which the outcome of an implemented corrective action is logged, analyzed, and used to retrain or refine the language models.

In some examples, the contextual descriptions generated by the language models may further support prioritization of tasks related to corrective actions (e.g., maintenance tasks) based on severity, urgency, and operational impact (e.g., their potential for operational disruption or downtime). For instance, a contextual description generated by the one or more language models may include a prioritization score that reflects the severity, urgency, and operational impact associated with an anomaly. The system may use the prioritization score to categorize corrective actions (e.g., indicating whether a corrective action should be performed immediately, scheduled for a later time, or deferred indefinitely).

The techniques described herein may be used for identifying and resolving emerging equipment issues prior to failure, which may be referred to as "predictive maintenance." Performing predictive maintenance may reduce unplanned downtime and may extend the lifespan of physical assets as compared to other techniques in which equipment issues are resolved at the time of failure (e.g., reactive maintenance). Additionally, it should be noted that the techniques described herein may be applied to environments distinct from manufacturing environments (e.g., other environments in which real-time monitoring of complex systems occurs). For instance, in a healthcare environment, telemetry data received from physiological sensors (e.g., from infusion pumps or diagnostics equipment) and/or records derived from electronic health systems may serve as input stream data. In such examples, the system described herein may be adapted to process such inputs using one or more associated language models and to generate resolution suggestions that assist with care delivery. Other examples include tracking physical assets (e.g., HCAC systems, elevators, lighting) within a facility for improved energy usage and monitoring network performance, server uptime, and software processes for errors or inefficiencies. Additionally, or alternatively, the techniques described herein may be utilized to monitor metrics such as energy consumption to meet compliance with internal policies or external regulatory constraints.

Figure 14:
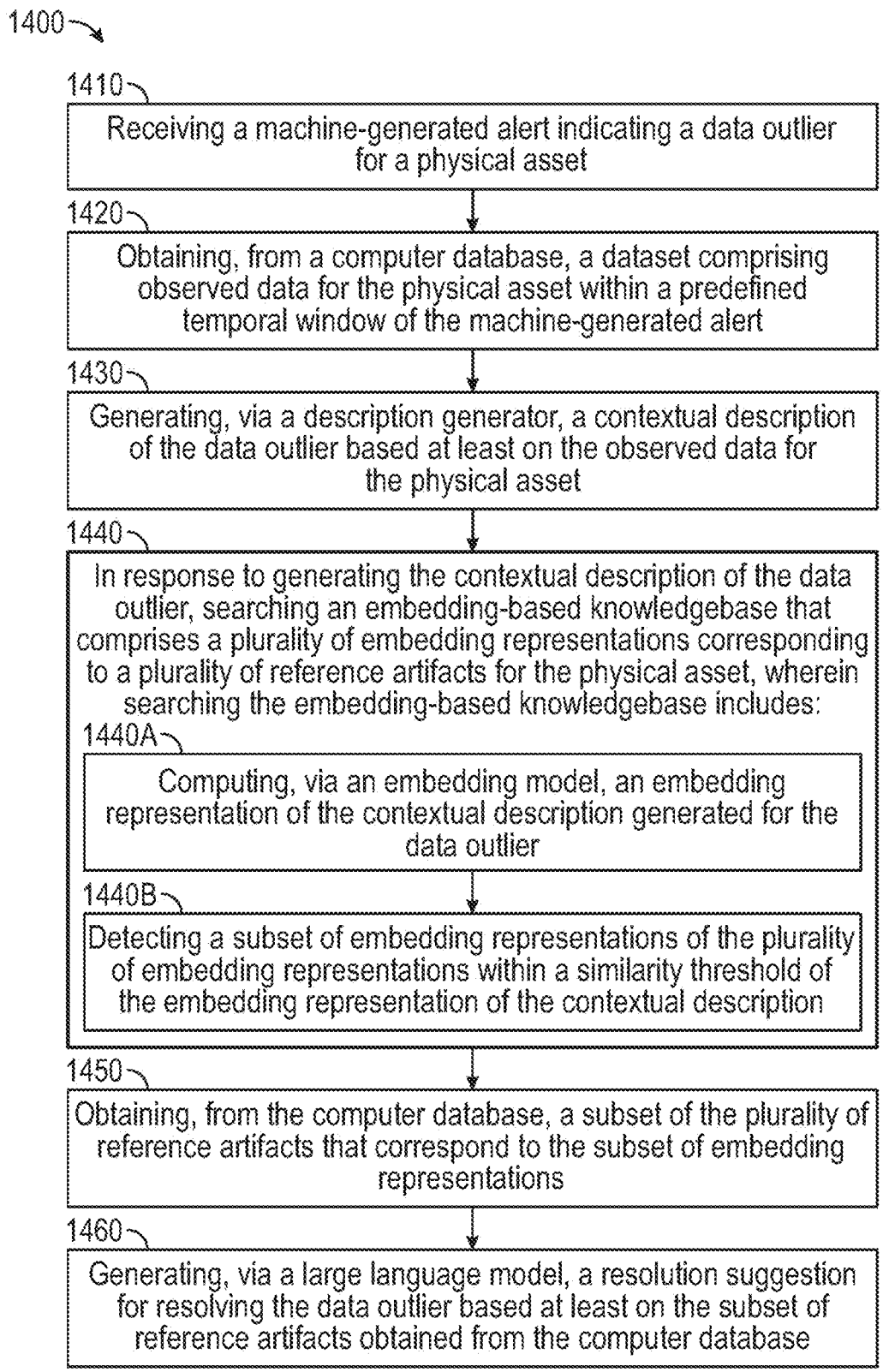
FIG. 14 illustrates a flow chart showing an example method that enables automated anomaly detection and resolution in telemetry-based monitoring systems according to some embodiments of the present technology.

FIG. 14 illustrates one embodiment of method 1400. It shall be appreciated that other embodiments contemplated within the scope of the present disclosure may involve more processes, fewer processes, different processes, or a different order of processes than illustrated in FIG. 14. It should be noted that a computer-program product may include a non-transitory machine-readable storage medium storing computer instructions that, when executed by one or more operations, may perform operations corresponding to the processes and sub-processes of method 1400. Additionally, or alternatively, a computer-implemented method may include operations corresponding to processes and sub-processes of 1400. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 1400.

Figure 15A:
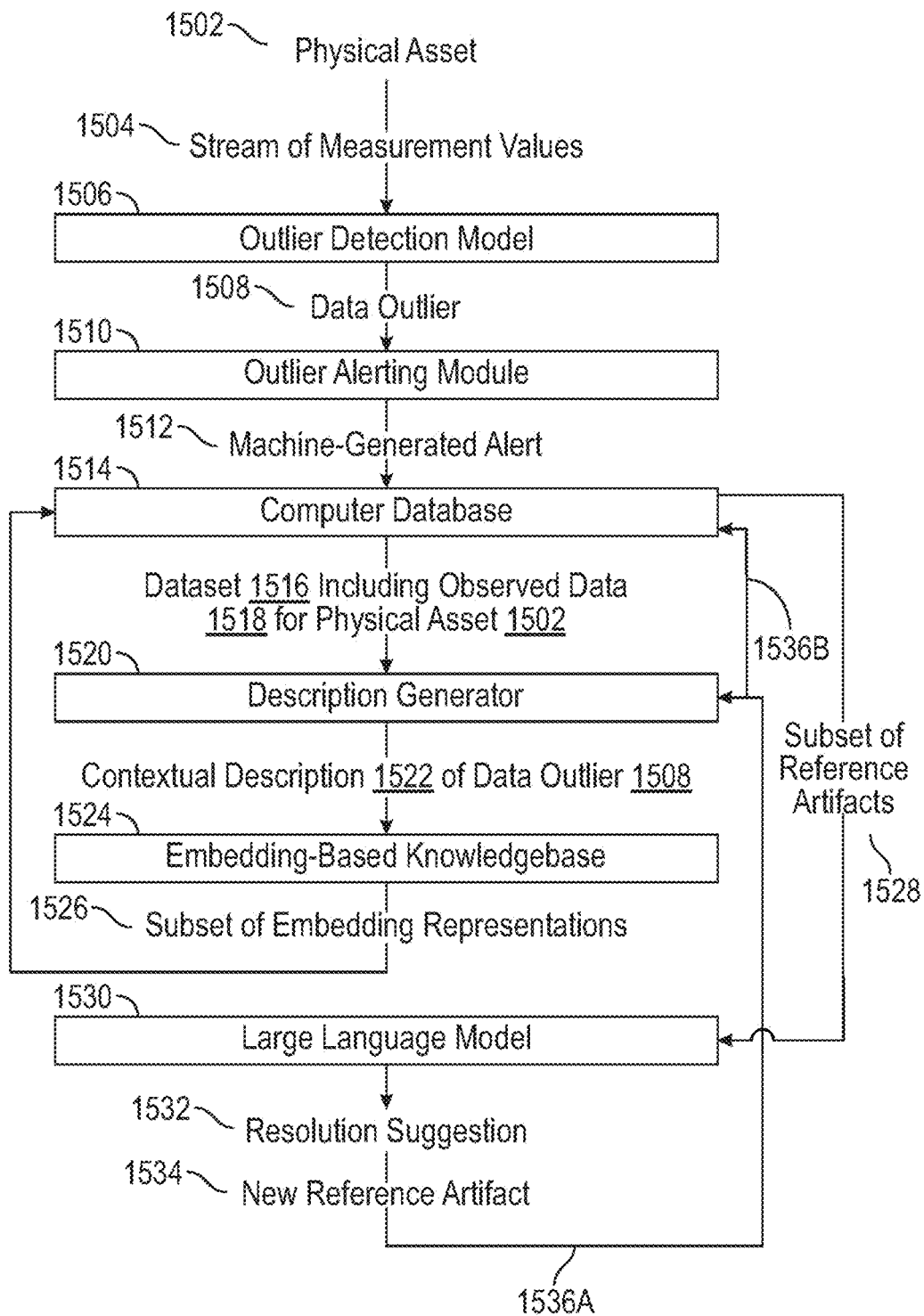
FIG. 15A illustrates an example anomaly detection procedure that enables automated anomaly detection and resolution in telemetry-based monitoring systems according to some embodiments of the present technology.

As shown in FIG. 14, process 1410 of method 1400 may receive a machine-generated alert indicating a data outlier for a physical asset. For instance, in a non-limiting example as depicted in FIG. 15A, a physical asset 1502 may provide a stream of measurement values 1504 to an outlier detection model 1506. The outlier detection model 1506 may detect a data outlier 1508 within the stream of measurement values 1504 and may provide the data outlier 1508 to outlier alerting module 1510 which may provide a machine-generated alert 1512 to a computer database.

The term "physical asset" may refer to a physical system, machine, device, or subcomponent from which measurement data (e.g., telemetry data) may be obtained. Each physical asset 1502 may include or be coupled with a set of measuring devices or sensors configured to capture measurable parameters (e.g., voltage, current, temperature, vibration, rotation speed) whose values are included in the measurement data. Examples of measurable parameters may include, but not be limited to: root mean square (RMS) voltage, RMS current, real power output, peak voltage, peak current, average line-neutral voltage, average current draw, total active power, rotational speed, actual current, actual torque, electrical supply frequency, winding temperature, bearing temperature, vibration levels, lubrication status, ambient temperature, air pressure (or flow), liquid flow rates, liquid pressure, insulation resistance, power factor, maximum unused reactive energy, minimum unused reactive energy, power output, motor protection indicators, or fault indicators (e.g., overcurrent sensing, shaft grounding status, over-temperature alerts).

The phrase "stream of measurement values" may refer to a sequence of snapshots of the measurable parameters captured by the set of measuring devices or sensors. The sequence of snapshots may grow over time (e.g., in a continuous or periodic fashion) or may be implemented as a rolling window (e.g., a fixed-length buffer) that retains only the N most values for each parameter, where N is greater than or equal to 1. The term "snapshot" as described herein may refer to a structured record (e.g., entry, a row in a table) within the stream of measurement values that captures a synchronized (or near synchronized) set of sensor readings from a physical asset at a specific point in time (e.g., a set of sensor readings associated with the same timestamp). In some examples, the physical asset may transmit the real-time stream of measurement values directly to a computer database.

Figure 15B:
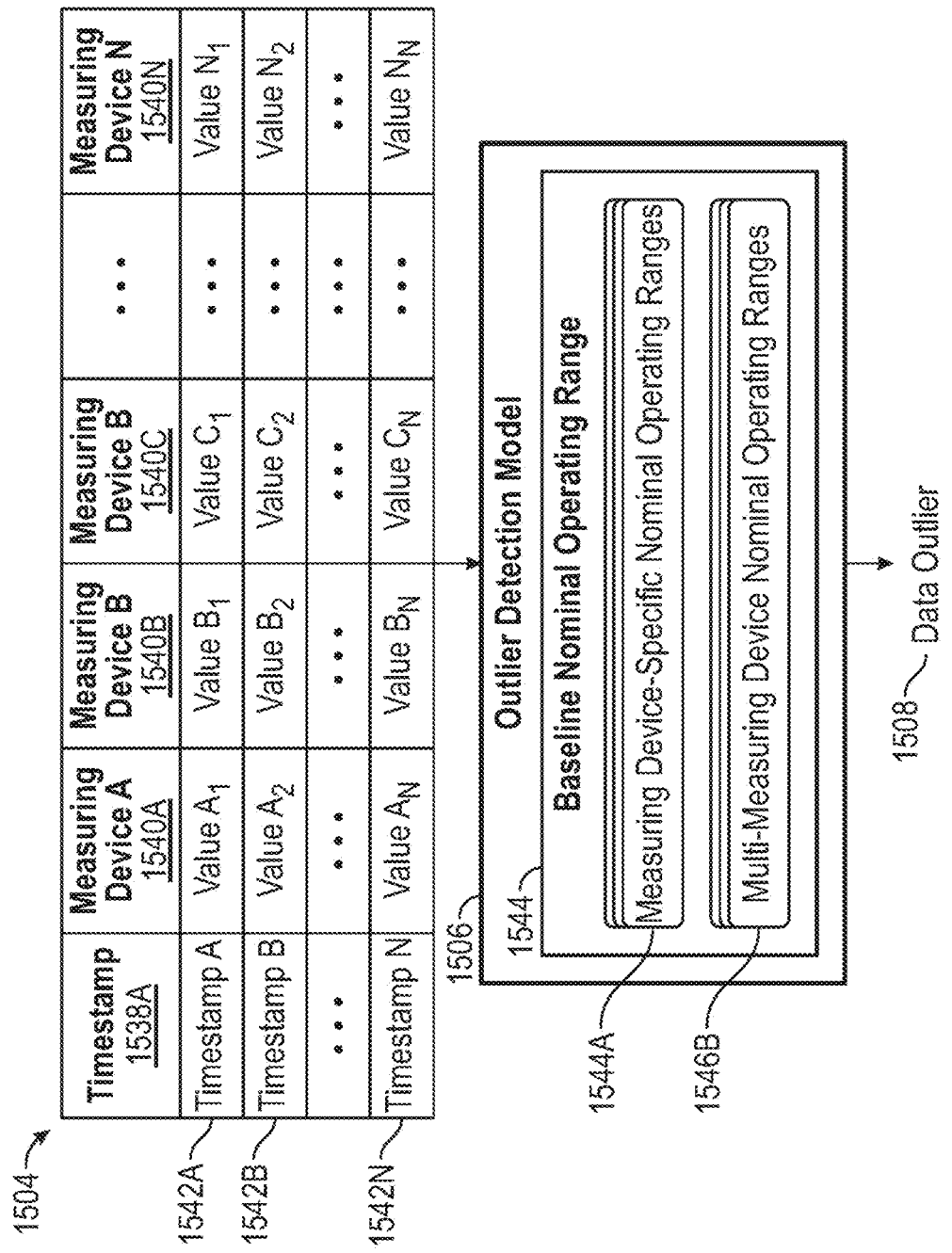
FIG. 15B illustrates an example data outlier detection procedure that enables automated anomaly detection and resolution in telemetry-based monitoring systems according to some embodiments of the present technology.

In a non-limiting example as described with reference to FIG. 15B, each snapshot (e.g., entry) within the stream of measurement values 1504 may include a corresponding timestamp 1538A, a first measurement value for a first measuring device 1540A (i.e., measuring device A), a second measurement value for a second measuring device 1540B (i.e., measuring device B), a third measurement value for a third measuring device 1540C (i.e., measuring device C), and a fourth measurement value for a fourth measuring device 1540N (i.e., measuring device N). It should be noted that there may be examples where multiple measurement values (e.g., corresponding to different measurable parameters) may be included for some or each of the measuring devices. A timestamp 1538A and the associated measurement values at that timestamp 1538A may be captured in a respective snapshot. For instance, snapshot 1542A may represent measurement values at a first timestamp (i.e., Timestamp A), snapshot 1542B may represent measurement values at a second timestamp (i.e., Timestamp B), and snapshot 1542C may represent measurement values at a third timestamp (i.e., Timestamp N).

The term "data outlier" may refer to a measurement value or measurement values that deviate from objective criteria, such as. a preconfigured operating range or a statistical baseline. A measurement value corresponding to a single measuring device may be data outlier if it is outside of a preconfigured device-specific operating range (e.g., a device-specific nominal operating range) for that measurement value. For instance, if a device-specific operating range for a first measuring device is between 50° C. and 75° C. and the first measuring device captures a temperature of 80° C., then the temperature of 80° C. may be a data outlier. A set of measurement values corresponding to multiple measuring devices may be a data outlier if the measurement values are outside of a multi-measuring device operating range (e.g., a multi-measuring device nominal operating range), where a multi-measuring device operating range may refer to an expected interdependent behavior or statistical relationship between two or more measurable parameters. For instance, if a multi-measuring device operating range indicates that a positive correlation should be present between a first measuring device's temperature and a second measuring device's current, then a negative correlation occurring between the first measuring device's temperature and a second measuring device's current may be a data outlier.

In some examples, the data outlier may be detected by an outlier detection model that receives the stream of measurement values from the physical asset. The outlier detection model may be trained on nominal historical measurement values associated with the physical asset to establish a baseline nominal operating range for the stream of measurement values, where the baseline nominal operating range includes one or more device-specific nominal operating ranges for the measuring devices of the physical asset and one or more multi-measuring device nominal operating ranges for the measuring devices of the physical asset. In some examples, the outlier detection model may employ statistical learning techniques such as Support Vector Data Description (SVDD), which may define a hypersphere around historical data representing normal behavior. A data point may be flagged as an outlier when it lies outside this hypersphere. SVDD may enable unsupervised detection of anomalies based on deviations from expected multivariate relationships.

In a non-limiting example, as described with reference to FIG. 15B, an outlier detection model 1506 may be trained on historical measurement values in order to establish a baseline nominal operating range 1544, where the baseline nominal operating rate includes one or more measuring device-specific nominal operating ranges 1544A and one or more multi-measuring device nominal operating ranges 1546B. The outlier detection model may be configured to detect a data outlier 1508 from the stream of measurement values 1504.

The term "machine-generated alert" as described herein may refer to an automated signal, notification, or event trigger produced by a system, component, or sub-component based on detection of a data outlier. The machine-generated alert may be provided to a computer database or a component coupled with the computer database in order to trigger the obtaining of stored measurement data associated with the data outlier. In some examples, generating the alert may include receiving, at an outlier alerting module, the data outlier from the outlier detection and providing the alert to a computer database or a component coupled with the computer database. In some examples, the machine-generated alert does not indicate which of the measuring devices of the physical asset are causing the data outlier.

As shown in FIG. 14, process 1420 of method 1400 may obtain, from a computer database, a dataset including observed data for the physical asset within a predefined temporal window of the machine-generated alert. For instance, in a non-limiting example as described with reference to FIG. 15A, a computer database 1514 may receive a machine-generated alert 1512 from outlier alerting module 1510 and may provide, to a description generator 1520, a dataset 1516 including observed data 1518 for physical asset 1502.

The term "dataset" may refer to a structured collection of data and the term "observed data" may refer to measurement data of measuring devices that has been captured from a stream of measurement values. The observed data being for the physical asset may refer to the measurement data being captured from measuring devices of the physical asset. The observed data being within a predefined temporal window of the machine generated alert may refer to each measurement value of the observed data having a corresponding timestamp that is within a predefined range of time relative to when the machine generated alert was generated or received. It should be noted that there may be examples where the predefined range of time may extend to after the machine generated alert was generated or received, in which case the system or service implementing method 1400 may wait to proceed to 1430 until the predefined range of time has fully elapsed.

The computer database may store the observed data within the dataset as a series of time-stamped records, where each record may include a respective snapshot of observed parameters from the set of measuring devices associated with a particular physical asset. Accordingly, obtaining the observed data may include extracting any records whose timestamps are within the predefined temporal window.

As shown in FIG. 14, process 1430 of method 1400 may generate, via a description generator, a contextual description of the data outlier based on the observed data for the physical asset. In a non-limiting example, as described with reference to FIG. 15A, computer database 1514 may provide a dataset 1516 including observed data 1518 for physical asset 1502 to description generator 1520 and description generator 1520 may generate a contextual description 1522 of data outlier 1588 based on the observed data 1518.

The term "contextual description" may refer to a machine-generated prompt (e.g., a natural language prompt or structured prompt) that characterizes a condition of the physical asset based on the data outlier. The contextual description may, for instance, include an identification of the affected physical asset, the one or more measurement values associated with the data outlier, and/or a comparison of those values to defined operational thresholds.

The term "description generator" may refer to a software module or hardware component that generates the contextual description from observed data. In order to generate the contextual description from the observed data, the description generator may apply rule-based logic to determine whether a measurement value exceeds or falls below a predefined condition criterion. If a measurement value satisfies the predefined condition criterion, then the description generator may generate the contextual description with a corresponding section that references the rule whose condition criterion is satisfied. Alternatively, if none of the condition criteria are satisfied, the description generator may apply statistical or machine learning-based analysis to determine relationships among measurement values and may generate the contextual description with a corresponding section that references a statistical or machine learning-based anomaly that is detected via the analysis.

One or more techniques may be utilized for generating contextual descriptions, which may also be referred to as "prompts". One such technique may include rule-based prompting, in which predefined thresholds and/or templates may trigger alerts based on anomalies. Another technique may be anomaly detection with natural language generation, in which the system described herein may generate dynamic, descriptive prompts using natural language generation, incorporating context and historical fault patterns. Yet another technique may be knowledge-based prompting, in which the system described herein may query historical fault databases for similar patterns to generate context-aware prompts (e.g., using algorithms like cosine similarity). Still another technique may be event-driven prompting via complex event processing (CEP), in which the system described herein may detect real-time anomalies through CEP engines and may generate prompts based on operational events and sensor reading. A further technique may include supervised learning for prompt generation, which may use machine learning models to map specific anomalies to natural language descriptions, which may improve over time through feedback. An additional technique may include multi-modal prompt generation, in which metadata (e.g., maintenance schedules) is fused with telemetry data in order to generate more contextually relevant prompts. A further additional technique may include reinforcement learning, in which prompt generation is continuously refined through feedback loops, where the system described herein may learn from operator responses and past maintenance (e.g., past repairs) to generate more accurate and efficient prompts over time.

In some examples, generating the contextual description may occur based on identifying that one or more measurement values associated with a physical asset satisfy condition criteria specified by a pre-defined measurement exception rule (e.g., via application of rule-based logic). The term "condition criteria" may refer to a set of threshold-based or logical constraints that define operating limits for a given measurable parameter. Such criteria may include minimum and maximum permissible values (e.g., a range), a rate-of-change limit (e.g., how quickly the values may be allowed to change), a duration threshold (e.g., how long the values are allowed to be out of bounds), or a combination thereof. Condition criteria may be derived from technical specifications (e.g., manufacturing specifications) or operational data or may be configured via user input to the system or service implementing method 1400.

The phrase "pre-defined measurement exception rule" may refer to rule-based logic that a description generator may use to detect violations of the condition criteria. The rule may include one or more of a condition criterion to be satisfied and an indication of a corrective action to take upon the condition criteria being satisfied. The term "corrective action" may refer to an operational response intended to resolve, mitigate, or further acquire information about the condition associated with the data outlier. Examples of corrective actions may include replacing a bearing assembly associated with the physical asset, scheduling lubrication of a component associated with the physical asset, reducing load on a motor associated with the physical asset, or performing diagnostics on a voltage regulator associated with the physical asset. Corrective actions may be derived from maintenance records or may be configured via user input to the system or service implementing method 1400.

In examples in which generating the contextual description occurs based on identifying that the one or more measurement values associated with the physical asset satisfy condition criteria, the description generator may construct a contextual description that incorporates one or more of the observed measurement data for the physical asset during the predefined temporal window; the condition criteria and the corresponding threshold that was satisfied; one or more identifying attributes of the physical asset (e.g., an asset type, an asset IT); one or more identifying attributes of the measuring device (e.g., a sensor ID, a location); and an associated corrective action. For instance, if the physical asset is a motor with an ID of CAB231 and a measuring device with an ID of EDF546 records a vibration level of 6.5 mm per second and a condition criteria specifies that a vibration level should be below 4.5 mm per second, then an example contextual description may state: "High vibration level detected on motor CAB231 from sensor EDF546: 6.5 mm per seconds exceeds defined limit of 4.5 mm per second. Action recommended: inspect bearing assembly for misalignment or lubrication failure."

Figure 15C:
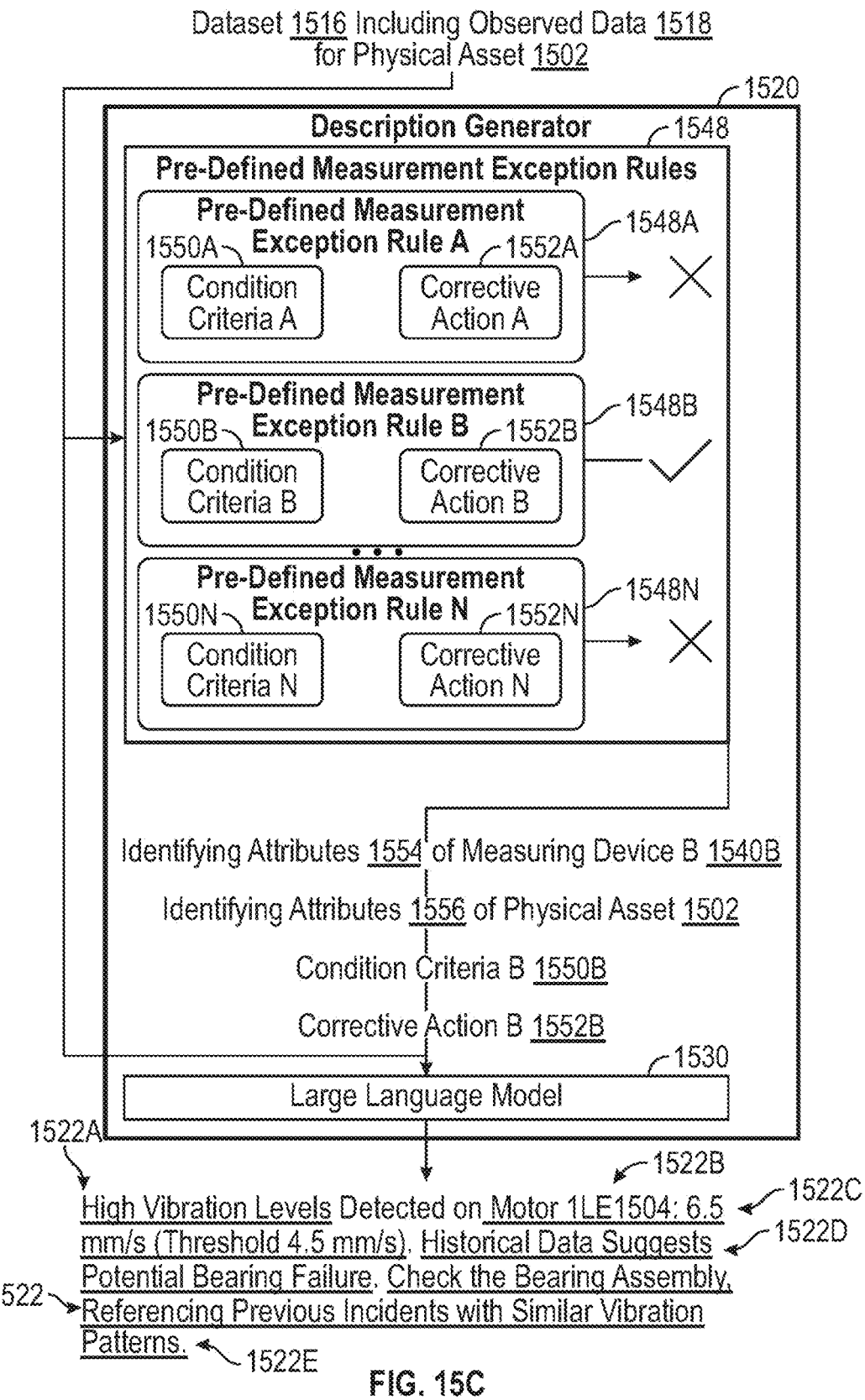
FIGS. 15C through 15F illustrates examples of contextual description generation procedures that enable automated anomaly detection and resolution in telemetry-based monitoring systems according to some embodiments of the present technology.

In a non-limiting example, as described with reference to FIG. 15C, description generator 1520 may receive a dataset 1516 including observed data 1518 for physical asset 1502. Description generator 1520 may detect whether the measurement values associated with the observed data 1518 satisfy condition criteria of a set of pre-defined measurement exception rules 1548, where the pre-defined measurement exception rules may include a first pre-defined measurement exception rule 1548A, a second pre-defined measurement exception rule 1548B, and a third pre-defined measurement exception rule 1548N. Pre-defined measurement exception rule 1548A may have an associated first condition criteria 1550A and an associated first corrective action 1552A. Likewise, pre-defined measurement exception rule 1548B may have an associated second condition criteria 1550B and an associated second corrective action 1552B. Further, pre-defined measurement exception rule 1548N may have an associated third condition criteria 1550N and an associated third corrective action 1552N.

Description generator 1520 may detect that a measurement value of the set of measurement values satisfies second condition criteria 1552B. Accordingly, description generator 1520 may prompt LLM 1530 to generate a contextual description 1522 for data outlier 1508 based on the observed data 1518, the second condition criteria 1550B, the second corrective action 1552B, one or more identifying attributes 1554 of a measuring device 1540B, and one or more identifying attributes 1556 of the physical asset 1502 associated with measuring device 1504B. The corresponding contextual description 1522 may include one or more sentences or portions that identify the physical asset (e.g., portion 1522B); provide a measurement value associated with the data outlier 1508 relative to a predefined measurement condition criterion (e.g., portion 1522C); specify a cause of the data outlier 1508 (e.g., portions 1522A and 1522D); specify a corrective action associated with the data outlier (e.g., portion 1522E suggesting indicating to check the bearing assembly); and suggest one or more types of reference artifacts to retrieve for the data outlier (e.g., portion 1522E indicating to reference previous incidents).

In examples in which none of the condition criteria are satisfied, the system or service implementing method 1400 may invoke a correlation analysis to attempt to detect a subset of measuring devices of the physical asset that exhibit a correlation coefficient exceeding or satisfying a predefined threshold and, if successful, to generate the contextual description based on the detected correlation coefficient. The term "correlation analysis" may refer to a statistical technique for assessing the degree to which two or more measurable parameters change in relation to one or another over a temporal window. Such analysis may be used to identify latent relationships or co-occurrence parameters among parameters that may not individually violate predefined thresholds (e.g., that may not individually satisfy condition criteria) but, when evaluated together, may reveal abnormal behavior indicative of a data outlier. The analysis may be implemented using pairwise statistical correlation metrics (e.g., Pearson correlation coefficients) computed across measurements for each measuring device of the physical asset, where the term "correlation coefficient" may refer to a numerical value that quantifies the magnitude and direction of a linear relationship between two variables.

In some examples, the system or service implementing method 1400 may construct a correlation matrix among the available measurement values within the observed data and may exceed measuring device pairs or groups with coefficients exceeding or satisfying a predefined threshold (e.g., greater than 0.9 or less than 0.9). Upon identifying a subset of measuring devices with coefficients satisfying or exceeding the predefined threshold, the description generator may generate a contextual description including this information.

For instance, the corresponding contextual description may reference the set of measuring devices, their associated measurement values, and relevant asset metadata. In a non-limiting example, the system may determine that two measuring devices (e.g., one measuring vibration and one measuring current) may exhibit a degree of correlation not previously observed during normal operations. Accordingly, the description generator may output: "Although all measurement values remained within nominal thresholds, correlation analysis identified an unexpected high degree of correlation between motor vibration and motor current (Pearson correlation coefficient: 0.93)."

Figure 15D:
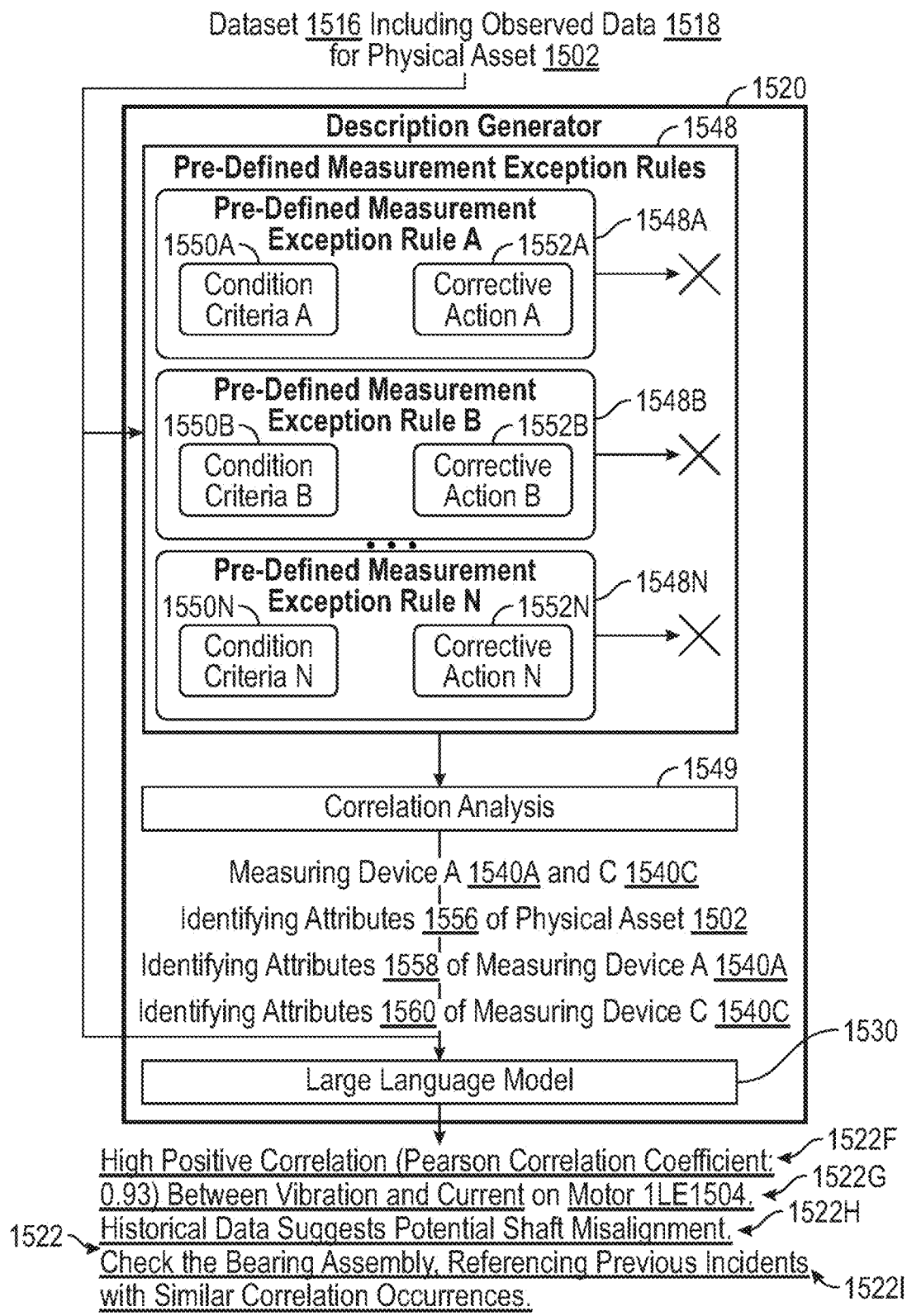

In a non-limiting example, as described with reference to FIG. 15D, description generator 1520 may receive a dataset 1516 including observed data 1518 for physical asset 1502. Description generator 1520 may detect that none of the measurement values associated with the observed data 1518 satisfy condition criteria of the set of pre-defined measurement exception rules 1548. Accordingly, description generator 1520 may perform correlation analysis 1549 to detect whether a subset of the measuring devices exhibit a correlation coefficient that exceeds or satisfies a threshold. In the present example, description generator 1520, via correlation analysis 1549, may determine that measuring devices 1540A and 1540C (e.g., a vibration sensor and a current sensor) exhibit a correlation that satisfies the threshold. Accordingly, description generator 1520 may prompt LLM 1530 to generate a contextual description for data outlier 1508 based on the observed data 1518, the correlation coefficient associated with measuring devices 1540A and 1540C, an identifying attribute 1556 of physical asset 1502, an identifying attribute 1558 of measuring device 1540A, and an identifying attribute 1560 of measuring device 1540C. The corresponding contextual description 1522 may include one or more sentences or portions that identify the physical asset (e.g., 1522G); provide a value of the correlation coefficient associated with the data outlier 1508 (e.g., portion 1522F); and specify a cause of the data outlier 1508 (e.g., portion 1522H). In some examples, the corresponding contextual description may further include an indication of a corrective action (e.g., portion 1522I).

In examples in which none of the condition criteria are satisfied and no significant correlations are detected, the description generator may use machine learning-based techniques to identify relevant measurement features associated with the data outlier. For instance, the description generator may detect one or more measuring devices of the physical asset that have a prediction contribution value exceeding a predefined contribution significance threshold and if successful, may generate the contextual description based on the detected prediction contribution value. The description generator may apply one or more machine learning models (e.g., decision trees, random forests, autoencoders, neural networks) to the dataset to identify non-linear relationships between measurable parameters.

The term "prediction contribution value" may refer to a numerical indicator that quantifies the extent to which a given measurable parameter influences a machine learning model's prediction or classification of a data outlier. The prediction contribution value may be derived via feature attribution techniques (e.g., Gini importance, Shapley Additive Explanations (SHAP) values, or permutation importance). The description generator may then compare the determined prediction contribution value against the pre-defined contribution significance threshold and may select any measuring devices whose predictive contribution values exceed the predefined contribution significance threshold.

The description generator may then generate the contextual description for the data outlier based on the selected measuring devices. For instance, the contextual description may include the identity of the relevant measuring devices, their prediction contribution values, and their associated measurement values. In a non-limiting example, the system may determine that two measuring devices (e.g., one measuring torque and one measuring temperature) may have predictive contribution values that exceed the predefined contribution significance threshold. Accordingly, the description generator may output: "Although all measurement values remained within nominal threshold and correlation analysis failed to detect significant correlations, prediction contribution analysis identified that temperature and torque exhibited significant predictive contributions (scores: 0.39 and 0.31, respectively)."

Figure 15E:
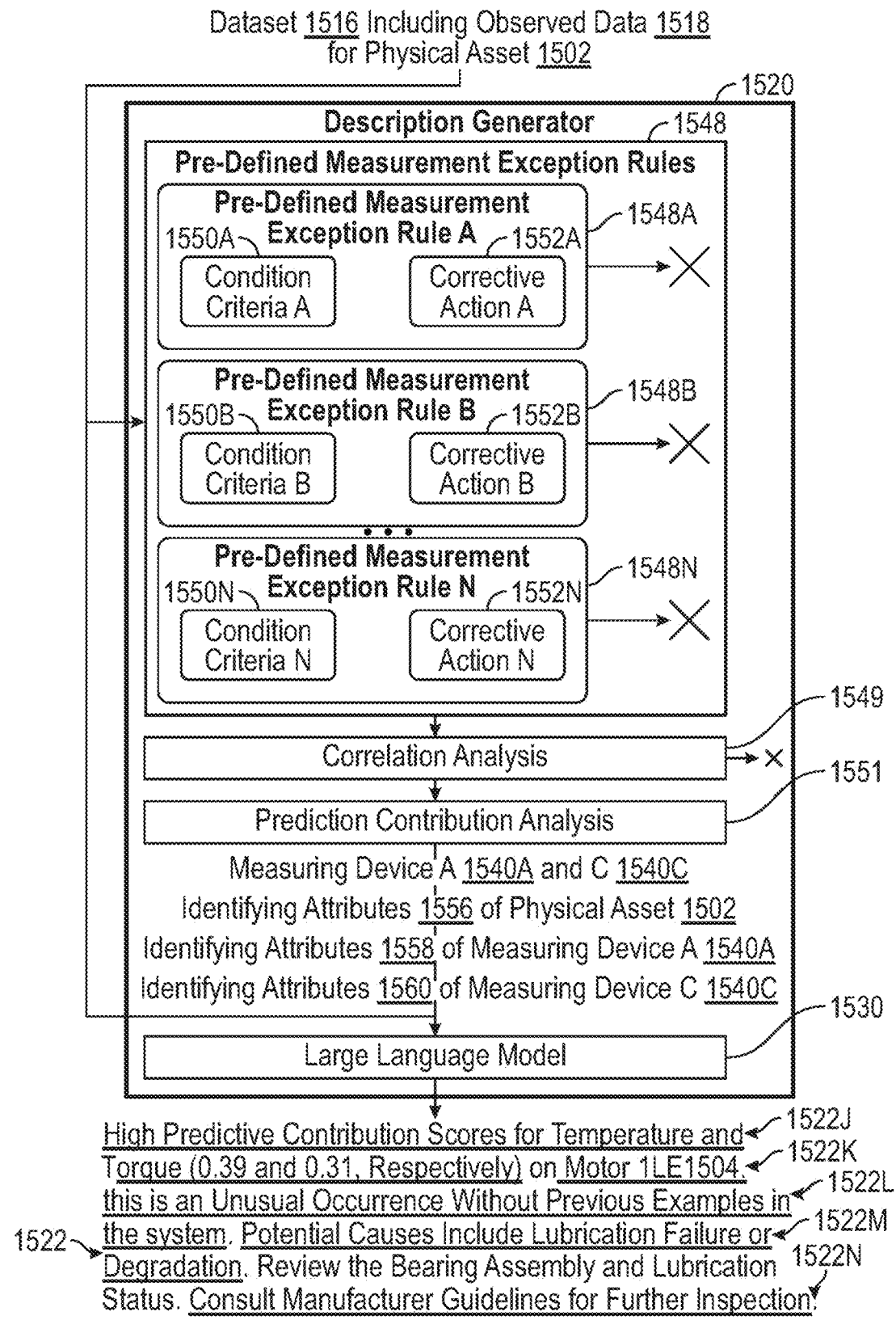

In a non-limiting example, as described with reference to FIG. 15E, description generator 1520 may receive a dataset 1516 including observed data 1518 for physical asset 1502. Description generator 1520 may detect that none of the measurement values associated with the observed data 1518 satisfy condition criteria of the set of pre-defined measurement exception rules 1548 and may further determine that no subsets of the measuring devices exhibit a correlation coefficient that exceeds or satisfies a threshold. Accordingly, description generator 1520 may attempt to detect one or more measuring devices of the physical asset that have a prediction contribution value exceeding a predefined contribution significance threshold via prediction contribution analysis 1551. In the present example, description generator 1520, via prediction contribution analysis 1551, may determine that measuring devices 1540A and 1540C (e.g., a temperature sensor and a torque sensor) each have a prediction contribution value that exceeds the predefined contribution significance threshold. Accordingly, description generator 1520 may prompt LLM 1530 to generate a contextual description for data outlier 1508 based on the observed data 1518, the prediction contribution value associated with measuring device 1540A, the prediction contribution value associated with measuring device 1540C, an identifying attribute 1556 of physical asset 1502, an identifying attribute 1558 of measuring device 1540A, and an identifying attribute of measuring device 1540C. The corresponding contextual description 1522 may include one or more sentences or portions that identify the physical asset (e.g., 1522K); provide a values of the prediction contribution values associated with the data outlier 1508 (e.g., portion 1522J); and specify a cause of the data outlier 1508 (e.g., portion 1522M). In some examples, the corresponding contextual description may further include an indication of a corrective action (e.g., portion 1522N). Additionally, the corresponding contextual description may indicate whether or not a similar occurrence has occurred before (e.g., portion 1522L).

In some examples, when multiple pre-defined measurement exception rules are satisfied by the observed data, the description generator may perform a comparative analysis to determine the most probable correct action. In such cases, the system may identify each rule whose condition criteria has been met, extract the corrective actions associated with those rules, and apply a ranking function to evaluate a relative likelihood or suitability of each corrective action. The ranking may be computed based on one or more additional measurement values from at least one other measuring device (e.g., a measuring device whose measurement value does not satisfy a pre-defined measurement exception rule).

After performing the ranking, the description generator may select the highest-ranked corrective action and incorporate it into a generated contextual description. The contextual description may further include an indication of which pre-defined measurement exception rule the selected corrective action is derived from. As a non-limiting example, if the physical asset is a motor with ID CAB321 and both vibration level and temperature exceed their respective thresholds, the description generator may output the following contextual description: "Multiple exception conditions detected for motor CAB231. Vibration level=6.5 mm per second and temperature=84 degrees Celsius both exceed respective thresholds. Based on normal torque and normal temperature values, lubrication failure is determined to be the most probable issue. Action recommended: schedule lubrication."

Figure 15F:
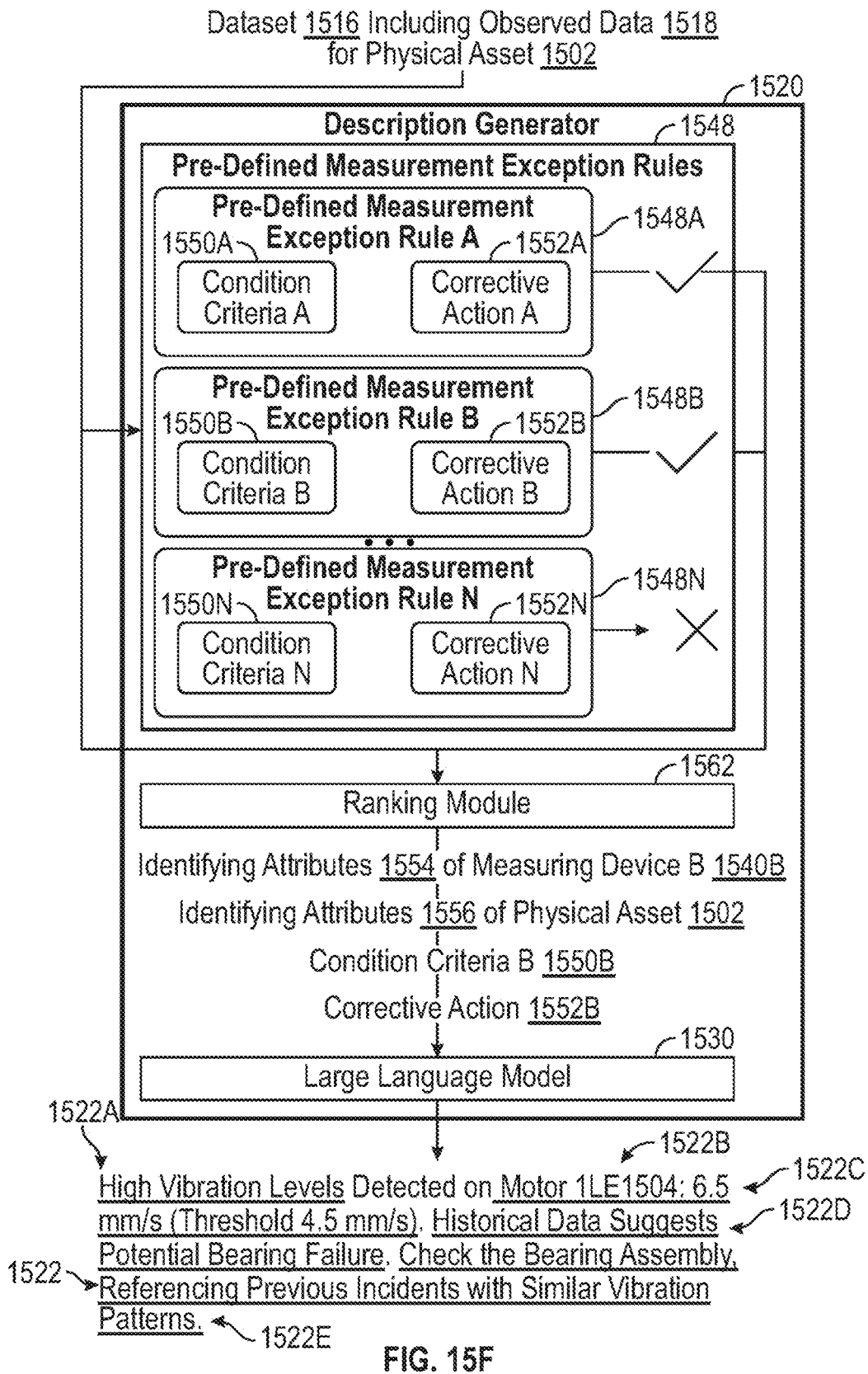

In a non-limiting example, as described with reference to FIG. 15F, description generator 1520 may receive a dataset 1516 including observed data 1518 for physical asset 1502. Description generator 1520 may detect whether the measurement values associated with the observed data 1518 satisfy condition criteria of a set of pre-defined measurement exception rules 1548. In the present example, description generator 1520 may detect that measurement values of the set of measurement values satisfies first condition criteria 1550A and second condition criteria 1550B. Description generator 1520 may use ranking module 1562 to rank first corrective action 1552A relative to second corrective action 1552B. In the present example, description generator 1520 may determine that second corrective action 1552B is the highest ranked corrective action and may prompt LLM 1530 to generate a contextual description 1522 for data outlier 1508 based on the observed data 1518, the second condition criteria 1550B, the second corrective action 1552B, one or more identifying attributes 1554 of a measuring device 1540B, and one or more identifying attributes 1556 of a measuring device associated with the respective measurement value (e.g., measuring device 1540B). The corresponding contextual description 1522 may include one or more sentences or portions that identify the physical asset (e.g., portion 1522B); provide a measurement value associated with the data outlier 1508 relative to a predefined measurement condition criterion (e.g., portion 1522C); specify a cause of the data outlier 1508 (e.g., portions 1522A and 1522D); specify a corrective action associated with the data outlier (e.g., portion 1522E suggesting indicating to check the bearing assembly); and suggest one or more types of reference artifacts to retrieve for the data outlier (e.g., portion 1522E indicating to reference previous incidents).

In general, the contextual description generated for the data outlier may include one or more sentences that identify the physical asset and describe a condition of the physical asset resulting from the data outlier. In some examples, the contextual description may further provide a measurement value associated with the data outlier relative to a predefined measurement condition criterion, specify a cause of the data outlier, specify a corrective action associated with the data outlier, and suggest one or more types of reference artifacts to retrieve for the data outlier. In examples in which the description generator identifies that a pre-defined measurement exception rule is associated with the data outlier, the one or more sentences may indicate that the cause of the data outlier has been previously observed. Alternatively, in examples in which the description generator identifies that no pre-defined measurement exception rule is associated with the data outlier, the one or more sentences may indicate that the cause of the data outlier is unknown.

As shown in FIG. 14, process 1440 of method 1400 may, in response to generating the contextual description of the data outlier, search an embedding-based knowledgebase that includes a set of embedding representations corresponding to a set of reference artifacts for the physical asset. In a non-limiting example, as described with reference to FIG. 15A, system 1500 may search embedding-based knowledgebase 1524 in response to the contextual description 1522 of data outlier 1508, where the embedding-based knowledgebase 524 may include a set of embedding representations corresponding to a set of reference artifacts for the physical asset 1502.

The term "embedding-based knowledgebase" may refer to a data repository (e.g., a vector database) in which reference artifacts are stored in a vectorized form such that each reference artifact may be associated with one or more embedding representations. The embedding representations may be generated by an embedding model that captures the semantic meaning of each reference artifact and may facilitate similarity-based retrieval, in which the system implementing method 1400 may identify reference artifacts relevant to the contextual description based on vector proximity in an embedding space.

The term "reference artifact" may refer to a document, record, or structured object that contains information relevant to the operation, condition, diagnosis, or maintenance of a physical asset. In some examples, a reference artifact may correspond to a previously observed data outlier and may include, for example, a historical set of measurement values recorded during the outlier event, a determination of the cause or contributing factors associated with the outlier event, and a corrective action for resolving the outlier event. Examples of reference artifacts may include a historical operational record detailing system behavior under various conditions, a procedural guideline for handling various types of faults or anomalies, a diagnostic reference that documents failure modes and corresponding resolutions, an analytical case study, or a component specification document that outlines performance tolerances and/or failure thresholds.

Figure 15G:
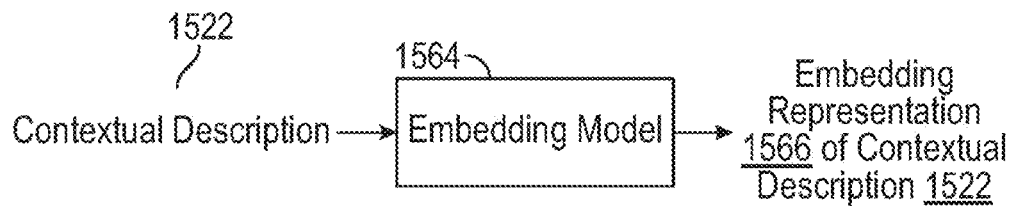
FIG. 15G illustrates an example embedding representation generation procedure that enables automated anomaly detection and resolution in telemetry-based monitoring systems according to some embodiments of the present technology.

As shown in FIG. 14, searching the embedding-based knowledgebase may include sub-process 1440A of process 1440 computing, via an embedding model, an embedding representation of the contextual description generated for the data outlier. The term "embedding model" may refer to a machine learning module configured to encode input data (e.g., a contextual description) as a numerical representation within a multi-dimensional space. The resulting representation, which may be referred to as an embedding representation, may include a set of numerical features that characterize a semantic content or contextual meaning of the input. In a non-limiting example, as described with reference to FIGS. 15A and 15G, system 1500 may compute, via embedding model 1564, an embedding representation 1566 of contextual description 1522.

As shown in FIG. 14, searching the embedding-based knowledgebase may further include sub-process 1440B of process 1440 detecting a subset of embedding representations of the set of embedding representations within a similarity threshold of the embedding representation of the contextual description. The term "similarity threshold" may refer to a predefined quantitative boundary used to evaluate the proximity between two embedding representations in a vector space. Vector similarity may be determined using metrics such as cosine similarity, Euclidean distance, or other vector-based distance functions. Detecting the subset of embedding representations may include comparing the computed vector embedding for the contextual description to the set of embedding representations stored within the embedding-based knowledgebase. Each comparison may yield a similarity score and the system or service implementing method 1400 may select a subset of the reference artifacts whose embedding representations fall within the predefined similarity threshold.

Figure 15H:
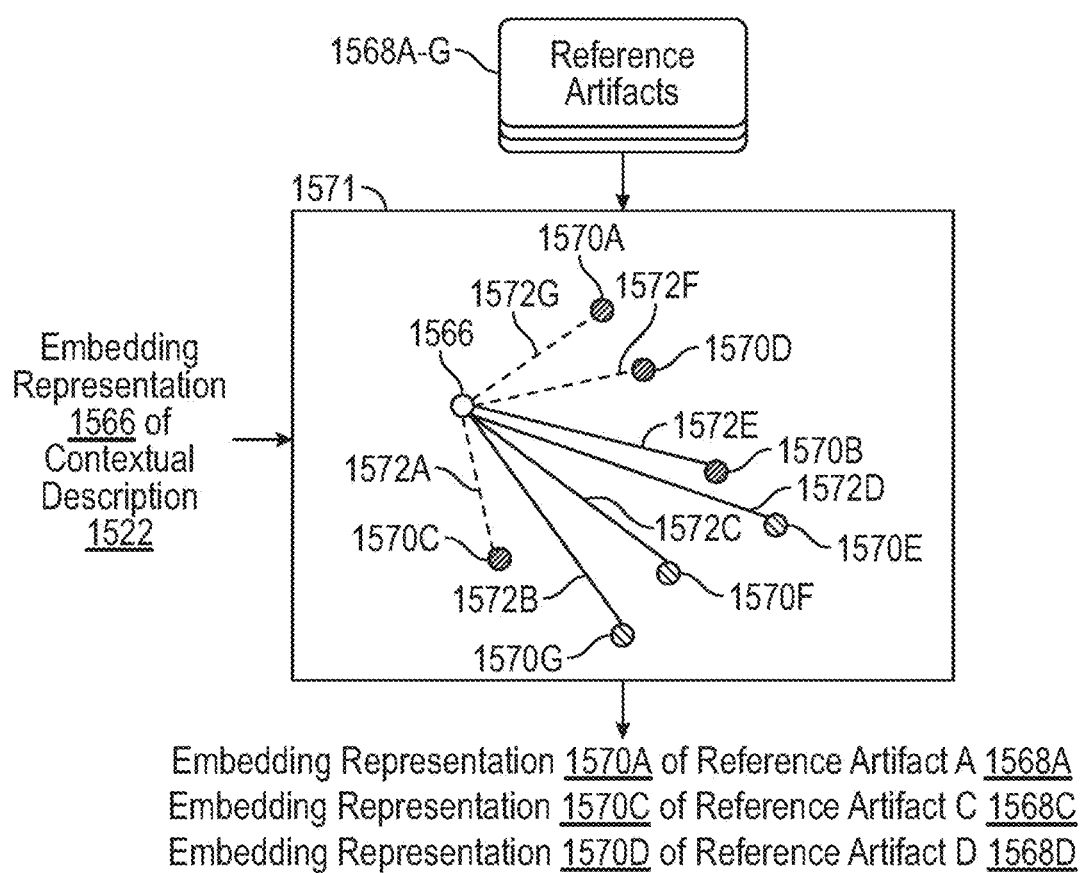
FIG. 15H illustrates an example reference artifact search procedure that enables automated anomaly detection and resolution in telemetry-based monitoring systems according to some embodiments of the present technology.

In a non-limiting example, as described with reference to FIGS. 15A and 15H, computer database 1514 may store reference artifacts 1568A through 1568G and embedding-based knowledgebase 1524 may store embedding representations corresponding to reference artifacts 1568A through 1568G. For instance, embedding-based knowledgebase 1524 may store first embedding representation 1570A for first reference artifact 1568A; second embedding representation 1570B for second reference artifact 1568B; third embedding representation 1570C for third reference artifact 1568C; fourth embedding representation 1570D for fourth reference artifact 1568D; fifth embedding representation 1570E for fifth reference artifact 1568E; sixth embedding representation 1570F for sixth reference artifact 1568F; and seventh embedding representation 1570G for seventh reference artifact 1568G. System 1500 may compute an embedding representation 1566 of contextual description 1522 (e.g., via embedding model 1564) and may compare a distance between embedding representation 1566 and each of embedding representations 1570A through 1570G. For instance, system 1500 may compute distance 1572G between embedding representation 1566 and embedding representation 1570A; distance 1572F between embedding representation 1566 and embedding representation 1570D; distance 1572E between embedding representation 1566 and embedding representation 1570B; distance 1572D between embedding representation 1566 and embedding representation 1570E; distance 1572C between embedding representation 1566 and embedding representation 1570F; distance 1572B between embedding representation 1566 and embedding representation 1570G; and distance 1572A between embedding representation 1566 and embedding representation 1570C.

After computing the distances between embedding representation 1566 and each of embedding representations 1570A through 1570G, system 1500 may select, via process 1571, the embedding representations that are within a threshold distance of embedding representation 1566. For instance, embedding representations 1570A, 1570C, and 1570D may have vector distances (e.g., distances 1572G, 1572A, and 1572F, respectively) within the threshold distance. Accordingly, system 1500 may detect embedding representations 1570A, 1570C, and 1570D as the subset of embedding representations and may proceed with extracting corresponding reference artifacts 1568A, 1568C, and 1568D, respectively, from computer database 1514.

In some examples, the embedding-based knowledgebase may organize (e.g., index) embedding representations of reference artifacts according to associated metadata (e.g., rule identifiers, condition criteria, labeled measurement patterns, fault types, asset types). When the contextual description is generated in response to a measurement value satisfying condition criteria of a pre-defined measurement exception rule, the system or service implementing method 1400 may limit the similarity search to a subset of embedding representations corresponding to reference artifacts associated with the same pre-defined measurement exception rule. For example, if a vibration measurement exceeds a threshold defined corresponding to a pre-defined measurement exception rule, the system or service implementing method 1400 may restrict the embedding comparison to only reference artifacts that have been tagged as satisfying the pre-defined measurement exception rule. Selectively narrowing the search space in this manner may improve the relevance of retrieved results.

When no close matches are found in the knowledgebase for a given contextual description, the system may invoke a fallback hypothesis generation mode. In this mode, the language model may leverage more general reference artifacts (e.g., general maintenance documentation or manufacturer guidelines) to generate a plausible resolution hypothesis. For example, in the absence of historical bearing failure data, the language model may infer, using the more general reference artifact, from increased vibration and reduced speed that early-stage bearing misalignment is likely and may formulate a prompt recommending appropriate inspection.

As shown in FIG. 14, process 1450 of method 1400 may obtain, from the computer database, a subset of the set of reference artifacts that correspond to the subset of embedding representations. Each embedding representation of the subset of embedding representations may be linked (e.g., via an associated index, pointer, or key) to a reference artifact stored in the computer database Accordingly, obtaining the subset of the set of reference artifacts may involve querying a lookup table, index map, or relational mapping structure that associates a given embedding representation with a respective reference artifact. It should be noted that a complete reference artifact or a particular portion of a reference artifact (e.g., a particular field, such as timestamp, asset ID, fault type, and resolution summary) may be returned from the computer database. In a non-limiting example, as described with reference to FIG. 15A, system 1500 may receive the subset of embedding representations 1526 from embedding-based knowledgebase 1524 and may obtain, from computer database 1514, a subset of reference artifacts 1528 that correspond to the subset of embedding representations 1526.

Figure 15I:
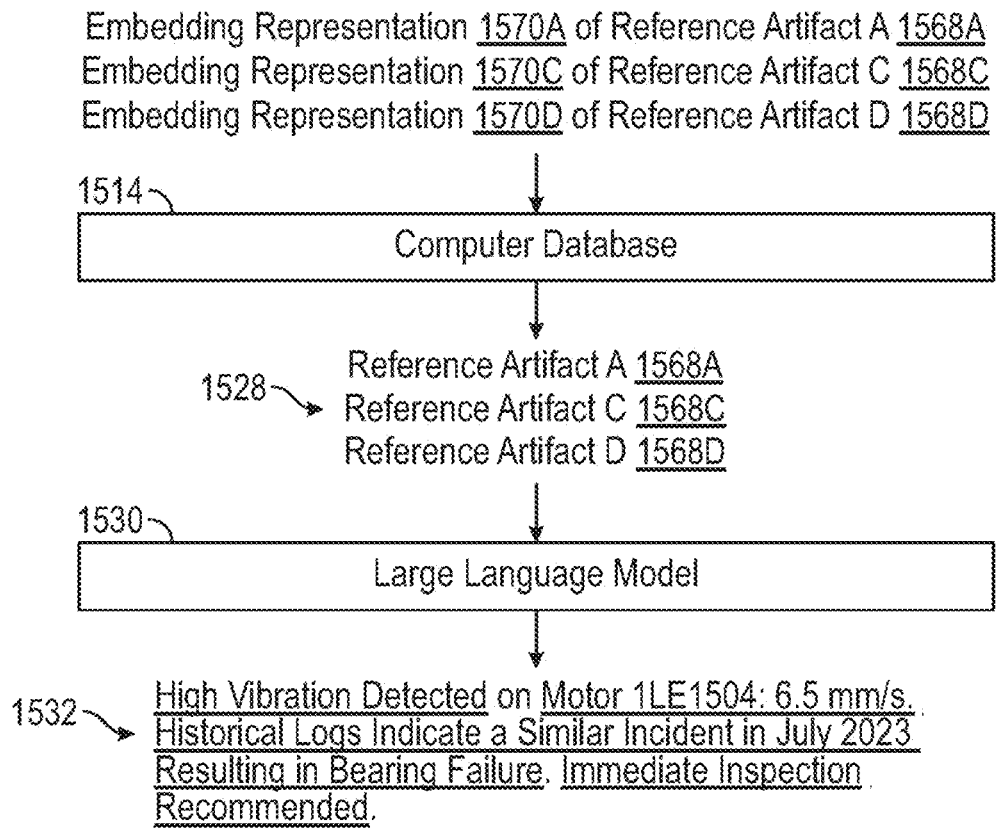
FIG. 15I illustrates an example resolution suggestion generation procedure that enables automated anomaly detection and resolution in telemetry-based monitoring systems according to some embodiments of the present technology.

In another non-limiting example, as described with reference to FIGS. 15A, 15H, and 15I, embedding representation 1570A of reference artifact 1568A, embedding representation 1570 of reference artifact 1568C, and embedding representation 1570D of reference artifact 1568D may be determined as the subset of embedding representations 1526. Accordingly, system 1500 may obtain, from computer database 1514, a subset of reference artifacts 1528 including reference artifacts 1568A, 1568C, and 1568D.

As shown in FIG. 14, process 1460 of method 1400 may generate, via a language model, a resolution suggestion for resolving the data outlier based on the subset of reference artifacts obtained from the computer database. In a non-limiting example, as described with reference to FIG. 15A, computer database 1514 may provide a subset of reference artifacts 1528 (e.g., and dataset 1516 including observed data 1518) to language model 1530 and language model 1530 may generate a resolution suggestion 1532 for resolving the data outlier based on the subset of reference artifacts 1528. In another non-limiting example, as described with reference to FIGS. 15A and 15I, computer database 1528 may provide a subset of reference artifacts 1528 including reference artifacts 1568A, 1568C and 1568D to language model 1530. Language model 1530 may use reference artifacts 1568A, 1568C, and 1568D along with the observed data 1518 to generate a resolution suggestion 1532.

The term "language model" may refer to a pre-trained or fine-tuned neural network model configured to process a natural language input and generate contextually relevant textual outputs in response to the natural language input. In the present example, the LLM may receive the contextual description of the data outlier and the retrieved reference artifacts and may use these inputs to generate a resolution suggestion. The term "resolution suggestion" may refer to a descriptive and actionable natural language output that identifies likely causes of a data outlier and recommends specific next steps. For instance, if the retrieved reference artifacts described prior events involving high vibration and fluctuating current resulting in bearing degradation, the LLM may generate a resolution suggestion such as "Inspect the bearing assembly for misalignment or wear. Previous cases with similar telemetry indicated early-stage bearing failure requiring replacement." In some embodiments, the LLM may provide references to retrieved documents to support the suggestion or may include alternative hypotheses for causes of the data outlier.

In some examples, the system or service implementing method 1400 may receive, via a user interface and/or an application programming interface (API), a request (e.g., a user request) to log an outcome (e.g., feedback) associated with the resolution suggestion. The outcome may represent a real-world action performed in response to the resolution suggestion (e.g., manually or via an automated system). The system may receive the outcome and may associate it with the corresponding contextual description and resolution suggestion to generate a new reference artifact in the computer database. The new reference artifact may include the contextual description, the resolution suggestion, and metadata representing the logged outcome (e.g., a timestamp, an associated user ID, a maintenance action performed). The system or service implementing method 1400 may generate an embedding representation for the new reference artifact and may provide the embedding representation to the embedding-based knowledgebase. Additionally, the system or service implementing method 1400 may use the new reference artifact to refine the description generator. For instance, the new reference artifact may be used to retrain or refine the rule-based logic, ranking functions, or update model parameters (e.g., correlation coefficient or feature contribution thresholds) to improve the accuracy and relevance of future prompts.

In a non-limiting example, as described with reference to FIG. 15A, language model 1530 may generate a new reference artifact 1534 based on resolution suggestion 1532 and contextual description 1522. Language model 1530 may store the new reference artifact 1534 at the computer database 1514 via signal 1536B and may provide the new reference artifact 1534 to description generator 1520 via signal 1536A (e.g., for refinement of description generator 1520). Additionally, a new embedding representation may be generated for new reference artifact 1534 and stored at embedding-based knowledgebase 1524. In some examples, the new reference artifact 1534 may be generated based on reception of an outcome of the resolution suggestion 1532 (e.g., received via a user interface), where the new reference artifact is based on the outcome.

In some examples, the system or service implementing method 1400 may perform operations that include transmitting a real-time notification to an electronic device (e.g., a user device) in response to detecting a data outlier and generating a corresponding resolution suggestion. The notification may include structured information such as the identity of the affected physical asset, the contextual description for the data outlier, and the resolution suggestion for the data outlier. Additionally, or alternatively, the system or service implementing method 1400 may include a real-time user interface configured to display information related to detected data outliers and corresponding resolution suggestions. The user interface may be presented via a web application, a mobile application, or a dashboard and may render structured visual elements including the physical asset identifier, timestamp associated with the data outlier, the contextual description for the data outlier, and the corresponding resolution suggestion. For instance, the user interface may show a graphical timeline of measuring device readings leading up to the data outlier and may highlight the measurement values associated with violated threshold.

In some embodiments, the system or service implementing method 1400 may employ an event stream processing (ESP) framework to continuously ingest and analyze the real-time stream of measurement values obtained from the physical asset. Utilizing an ESP framework may enable low-latency, high-throughput monitoring across multiple measurable parameters. Further, utilizing an ESP framework may support multivariate monitoring of tracking parameter combinations in real time, which may enable the system or service to detect emerging anomalies.

Figure 15J:
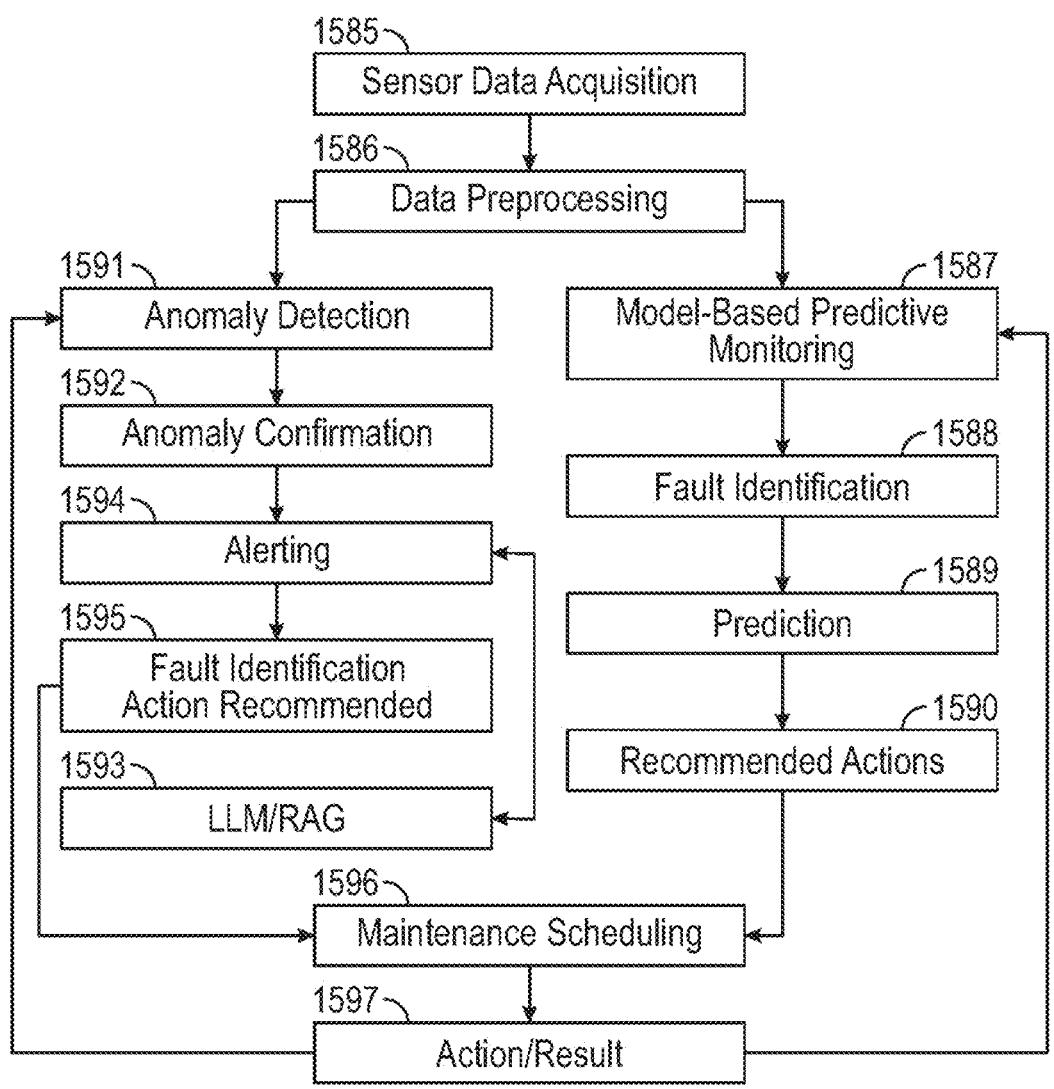
FIG. 15J illustrates an example condition monitoring procedure that enables automated anomaly detection and resolution in telemetry-based monitoring systems according to some embodiments of the present technology.

FIG. 15J may depict an example of a predictive maintenance procedure in accordance with aspects as described herein. At 1585, sensors or measuring devices of a physical asset may collect telemetry data and may provide the telemetry data to a system. The system may preprocess the data 1586 and may determine whether the data includes any previously detected fault patterns or if the data includes anomalies that have not been previously detected. If the system determines that the data has previously detected fault patterns (e.g., as detected via model-based predictive monitoring at 1587), the system may identify the fault at 1588 and may generate a prediction at 1589 (e.g., using one or more machine learning models) to identify corresponding recommended actions for the fault at 1590.

Alternatively, if the system determines that the system has anomalies that have not been detected previously (e.g., as detected via anomaly detection at 1591), the system may perform anomaly confirmation (e.g., confirming that the detected anomaly constitutes a true anomaly) at 1592 and may may proceed to generating an alert at 1594. The system may use a language model (e.g., an LLM) and/or retrieval augmented generation in order to generate the alert and may proceed at 1595 to perform fault identification and recommendation of actions (e.g., corrective actions). The system may perform automated maintenance scheduling or may provide an alert to manually perform maintenance scheduling at 1596. The corresponding action taken to resolve the detected fault pattern or the anomaly may be logged at 1597. If an anomaly was detected at 1591, the anomaly as well as the action that resolved the anomaly may be logged to the model that performed model-based predictive monitoring at 1587 in order to facilitate the anomaly being detected at 1587 in future incidents.

It should be noted that aspects of FIG. 15J may relate to aspects of FIG. 14 without deviating from the scope of the present disclosure. For instance, the alert generated at 1593 may correspond to the alert that is provided to process 1410 of FIG. 14. Process 1420 through process 1460 may then represent steps performed by 1594 in order to generate a resolution suggestion that is included in the alert and provided to 1595. At 1595, the fault and associated recommended actions may be identified from the resolution suggestion.

It shall also be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:
   receiving a machine-generated alert indicating a data outlier for a physical asset;
   obtaining, from a computer database, a dataset comprising observed data for the physical asset within a predefined temporal window of the machine-generated alert;
   generating, via a description generator, a contextual description of the data outlier based at least on the observed data for the physical asset;
   in response to generating the contextual description of the data outlier, searching an embedding-based knowledgebase that comprises a plurality of embedding representations corresponding to a plurality of reference artifacts for the physical asset, wherein searching the embedding-based knowledgebase includes:
      computing, via an embedding model, an embedding representation of the contextual description generated for the data outlier, and
      detecting a subset of embedding representations of the plurality of embedding representations within a similarity threshold of the embedding representation of the contextual description;
   obtaining, from the computer database, a subset of the plurality of reference artifacts that correspond to the subset of embedding representations; and
   generating, via a large language model, a resolution suggestion for resolving the data outlier based at least on the subset of reference artifacts obtained from the computer database.

2. The computer-program product according to claim 1, wherein:
   the observed data for the physical asset includes a plurality of measurement values for a plurality of measuring devices during the predefined temporal window, and
   generating the contextual description of the data outlier includes:
      detecting, via the description generator, that a respective measurement value of the plurality of measurement values satisfies condition criteria of a pre-defined measurement exception rule, and
      prompting the large language model to generate the contextual description of the data outlier based on:
         the observed data for the physical asset,
         the condition criteria and a corrective action associated with the pre-defined measurement exception rule, and
         one or more identifying attributes of the physical asset and a measuring device associated with the respective measurement value.

3. The computer-program product according to claim 1, wherein the contextual description generated for the data outlier includes one or more sentences that:
   identify the physical asset,
   describe a condition of the physical asset resulting from the data outlier,
   provide a measurement value associated with the data outlier relative to a predefined measurement condition criterion,
   specify a cause of the data outlier,
   specify a corrective action associated with the data outlier, and
   suggest one or more types of reference artifacts to retrieve for the data outlier.

4. The computer-program product according to claim 3, wherein the one or more sentences specifying the cause of the data outlier:
   indicate that the cause of the data outlier has been previously observed when the description generator identifies that a pre-defined measurement exception rule is associated with the data outlier, and
   indicate that a cause of the data outlier is unknown when the description generator identifies that no pre-defined measurement exception rule is associated with the data outlier.

5. The computer-program product according to claim 1, wherein:
   the observed data for the physical asset includes a plurality of measurement values for a plurality of measuring devices during the predefined temporal window, and
   generating the contextual description of the data outlier includes:
      detecting, via the description generator, that the plurality of measurement values do not satisfy condition criteria of a plurality of pre-defined measurement exception rules, and
      in response to detecting that the plurality of measurement values do not satisfy the condition criteria of the plurality of pre-defined measurement exception rules:
         detecting, via a correlation analysis, a subset of the plurality of measuring devices that exhibit a correlation coefficient exceeding a predefined threshold, and
         prompting the large language model to generate the contextual description of the data outlier based on:
            the observed data for the physical asset, the subset of the plurality of measuring devices that exhibit the correlation coefficient exceeding the predefined threshold, and
one or more identifying attributes of the physical asset and the subset of measuring devices.

6. The computer-program product according to claim 1, wherein:
the observed data for the physical asset includes a plurality of measurement values for a plurality of measuring devices during the predefined temporal window, and
generating the contextual description of the data outlier includes:
detecting, via the description generator, that the plurality of measurement values do not satisfy condition criteria of a plurality of pre-defined measurement exception rules,
detecting, via a correlation analysis, that the plurality of measuring devices do not include a set of measuring devices that exhibit a correlation coefficient exceeding a predefined threshold, and
in response to detecting that the plurality of measurement values do not satisfy the condition criteria of the plurality of pre-defined measurement exception rules and that the plurality of measuring devices do not include the set of measuring devices that exhibit the correlation coefficient exceeding the predefined threshold:
detecting, via a machine learning model, one or more measuring devices of the plurality of measuring devices that have a prediction contribution value exceeding a predefined contribution significance threshold, and
prompting the large language model to generate the contextual description of the data outlier based on:
the observed data for the physical asset,
the one or more measuring devices that have the prediction contribution value exceeding the predefined contribution significance threshold, and
one or more identifying attributes of the physical asset and the one or more measuring devices.

7. The computer-program product according to claim 1, wherein:
the description generator detected that a respective measurement value in the observed data for the physical asset satisfied condition criteria of a pre-defined measurement exception rule,
a set of measurement values associated with a first plurality of reference artifacts of the plurality of reference artifacts satisfy the condition criteria of the pre-defined measurement exception rule, and a set of measurement values associated with a second plurality of reference artifacts of the plurality of reference artifacts do not satisfy the condition criteria of the pre-defined measurement exception rule, and
detecting the subset of embedding representations within the similarity threshold of the embedding representation of the contextual description includes:
detecting the subset of embedding representations from a set of embedding representations corresponding to the first plurality of reference artifacts, and
forgoing detecting the subset of embedding representations from a set of embedding representations corresponding to the second plurality of reference artifacts.

8. The computer-program product according to claim 1, wherein:
the physical asset is associated with a plurality of measuring devices, and
the machine-generated alert does not indicate which of the plurality of measuring devices are causing the data outlier.

9. The computer-program product according to claim 1, wherein:
the data outlier is detected by an outlier detection model that receives a real-time stream of measurement values from the physical asset, and
the outlier detection model is trained on nominal historical measurement values associated with the physical asset to establish a baseline nominal operating range for the real-time stream of measurement values.

10. The computer-program product according to claim 9, wherein:
the physical asset is associated with a plurality of measuring devices, and
the baseline nominal operating range for the real-time stream of measurement values includes one or more of:
one or more measuring device-specific nominal operating ranges for one or more of the plurality of measuring devices, and
one or more multi-measuring device nominal operating ranges for two or more of the plurality of measuring devices.

11. The computer-program product according to claim 1, wherein:
the observed data for the physical asset includes a plurality of measurement values for a plurality of measuring devices during the predefined temporal window, and
generating the contextual description of the data outlier includes:
detecting, via the description generator, that a respective measurement value of the plurality of measurement values satisfies condition criteria of a plurality of pre-defined measurement exception rules,
ranking, via the description generator, a plurality of corrective actions associated with the plurality of pre-defined measurement exception rules based on a measurement value of at least one additional measuring device of the plurality of measuring devices,
selecting, via the description generator, a most probable corrective action for the data outlier based on the ranking of the plurality of corrective actions, and
prompting the large language model to generate the contextual description of the data outlier based at least on:
a first pre-defined measurement exception rule of the plurality of pre-defined measurement exception rules when the most probable corrective action corresponds to the first pre-defined measurement exception rule, and
a second pre-defined measurement exception rule of the plurality of pre-defined measurement exception rules when the most probable corrective action corresponds to the second pre-defined measurement exception rule.

12. The computer-program product according to claim 1, wherein a respective reference artifact of the plurality of reference artifacts corresponds to a historical data outlier and includes:
a set of measurement values observed during the historical data outlier,
an identified cause of the historical data outlier, and a corrective action performed to resolve the historical data outlier associated with the physical asset.

13. The computer-program product according to claim 1, wherein a respective reference artifact of the plurality of reference artifacts corresponds to one of: a historical operational record, a procedural guideline, a diagnostic reference, an analytical case study, and a component specification document.

14. The computer-program product according to claim 1, wherein the computer instructions, when executed by the one or more processors, perform operations further comprising:
receiving, via an interface, a user request to log an outcome of the resolution suggestion to the computer database, and
in response to receiving the user request:
creating, at the computer database, a new reference artifact that associates the data outlier with the outcome of the resolution suggestion, and
refining, via a feedback loop, the description generator using the new reference artifact.

15. The computer-program product according to claim 1, wherein:
the embedding model is a machine learning model configured to encode input data into a numerical representation within a multi-dimensional space and
the embedding representation of the contextual description numerically encodes the contextual description as a set of numerical features, wherein the set of numerical features corresponds to a dimensionality of the multi-dimensional space.

16. The computer-program product according to claim 1, wherein the computer instructions, when executed by the one or more processors, perform operations further comprising:
transmitting a real-time notification to an electronic device indicating the data outlier associated with the physical asset and the resolution suggestion for resolving the data outlier.

17. The computer-program product according to claim 1, wherein the computer instructions, when executed by the one or more processors, perform operations further comprising:
displaying a real-time user interface indicating the data outlier associated with the physical asset and the resolution suggestion for resolving the data outlier.

18. A computer-implemented method, comprising:
receiving a machine-generated alert indicating a data outlier for a physical asset;
obtaining, from a computer database, a dataset comprising observed data for the physical asset within a predefined temporal window of the machine-generated alert;
generating, via a description generator, a contextual description of the data outlier based at least on the observed data for the physical asset;
in response to generating the contextual description of the data outlier, searching an embedding-based knowledgebase that comprises a plurality of embedding representations corresponding to a plurality of reference artifacts for the physical asset, wherein searching the embedding-based knowledgebase includes:
computing, via an embedding model, an embedding representation of the contextual description generated for the data outlier, and
detecting a subset of embedding representations of the plurality of embedding representations within a similarity threshold of the embedding representation of the contextual description;
obtaining, from the computer database, a subset of the plurality of reference artifacts that correspond to the subset of embedding representations; and
generating, via a large language model, a resolution suggestion for resolving the data outlier based at least on the subset of reference artifacts obtained from the computer database.

19. The computer-implemented method according to claim 18, wherein:
the observed data for the physical asset includes a plurality of measurement values for a plurality of measuring devices during the predefined temporal window, and
generating the contextual description of the data outlier includes:
detecting, via the description generator, that a respective measurement value of the plurality of measurement values satisfies condition criteria of a pre-defined measurement exception rule, and
prompting the large language model to generate the contextual description of the data outlier based on:
the observed data for the physical asset,
the condition criteria and a corrective action associated with the pre-defined measurement exception rule, and
one or more identifying attributes of the physical asset and a measuring device associated with the respective measurement value.

20. The computer-implemented method according to claim 18, wherein the contextual description generated for the data outlier includes one or more sentences that:
identify the physical asset,
describe a condition of the physical asset resulting from the data outlier,
provide a measurement value associated with the data outlier relative to a predefined measurement condition criterion,
specify a cause of the data outlier,
specify a corrective action associated with the data outlier, and
suggest one or more types of reference artifacts to retrieve for the data outlier.

21. The computer-implemented method according to claim 20, wherein the one or more sentences specifying the cause of the data outlier:
indicate that the cause of the data outlier has been previously observed when the description generator identifies that a pre-defined measurement exception rule is associated with the data outlier, and
indicate that a cause of the data outlier is unknown when the description generator identifies that no pre-defined measurement exception rule is associated with the data outlier.

22. The computer-implemented method according to claim 18, wherein:
the observed data for the physical asset includes a plurality of measurement values for a plurality of measuring devices during the predefined temporal window, and
generating the contextual description of the data outlier includes:
detecting, via the description generator, that the plurality of measurement values do not satisfy condition criteria of a plurality of pre-defined measurement exception rules, and in response to detecting that the plurality of measurement values do not satisfy the condition criteria of the plurality of pre-defined measurement exception rules:
  detecting, via a correlation analysis, a subset of the plurality of measuring devices that exhibit a correlation coefficient exceeding a predefined threshold, and
  prompting the large language model to generate the contextual description of the data outlier based on:
    the observed data for the physical asset,
    the subset of the plurality of measuring devices that exhibit the correlation coefficient exceeding the predefined threshold, and
    one or more identifying attributes of the physical asset and the subset of measuring devices.

23. The computer-implemented method according to claim 18, wherein:
the observed data for the physical asset includes a plurality of measurement values for a plurality of measuring devices during the predefined temporal window, and generating the contextual description of the data outlier includes:
  detecting, via the description generator, that the plurality of measurement values do not satisfy condition criteria of a plurality of pre-defined measurement exception rules,
  detecting, via a correlation analysis, that the plurality of measuring devices do not include a set of measuring devices that exhibit a correlation coefficient exceeding a predefined threshold, and
  in response to detecting that the plurality of measurement values do not satisfy the condition criteria of the plurality of pre-defined measurement exception rules and that the plurality of measuring devices do not include the set of measuring devices that exhibit the correlation coefficient exceeding the predefined threshold:
    detecting, via a machine learning model, one or more measuring devices of the plurality of measuring devices that have a prediction contribution value exceeding a predefined contribution significance threshold, and
    prompting the large language model to generate the contextual description of the data outlier based on:
      the observed data for the physical asset,
      the one or more measuring devices that have the prediction contribution value exceeding the pre-defined contribution significance threshold, and
      one or more identifying attributes of the physical asset and the one or more measuring devices.

24. The computer-implemented method according to claim 18, wherein:
the description generator detected that a respective measurement value in the observed data for the physical asset satisfied condition criteria of a pre-defined measurement exception rule,
a set of measurement values associated with a first plurality of reference artifacts of the plurality of reference artifacts satisfy the condition criteria of the pre-defined measurement exception rule, and a set of measurement values associated with a second plurality of reference artifacts of the plurality of reference artifacts do not satisfy the condition criteria of the pre-defined measurement exception rule, and detecting the subset of embedding representations within the similarity threshold of the embedding representation of the contextual description includes:
  detecting the subset of embedding representations from a set of embedding representations corresponding to the first plurality of reference artifacts, and
  forgoing detecting the subset of embedding representations from a set of embedding representations corresponding to the second plurality of reference artifacts.

25. The computer-implemented method according to claim 18, wherein:
the physical asset is associated with a plurality of measuring devices, and
the machine-generated alert does not indicate which of the plurality of measuring devices are causing the data outlier.

26. The computer-implemented method according to claim 18, wherein:
the data outlier is detected by an outlier detection model that receives a real-time stream of measurement values from the physical asset, and
the outlier detection model is trained on nominal historical measurement values associated with the physical asset to establish a baseline nominal operating range for the real-time stream of measurement values.

27. The computer-implemented method according to claim 26, wherein:
the physical asset is associated with a plurality of measuring devices, and
the baseline nominal operating range for the real-time stream of measurement values includes one or more of:
  one or more measuring device-specific nominal operating ranges for one or more of the plurality of measuring devices, and
  one or more multi-measuring device nominal operating ranges for two or more of the plurality of measuring devices.

28. The computer-implemented method according to claim 18, wherein:
the observed data for the physical asset includes a plurality of measurement values for a plurality of measuring devices during the predefined temporal window, and
generating the contextual description of the data outlier includes:
  detecting, via the description generator, that a respective measurement value of the plurality of measurement values satisfies condition criteria of a plurality of pre-defined measurement exception rules,
  ranking, via the description generator, a plurality of corrective actions associated with the plurality of pre-defined measurement exception rules based on a measurement value of at least one additional measuring device of the plurality of measuring devices,
  selecting, via the description generator, a most probable corrective action for the data outlier based on the ranking of the plurality of corrective actions, and
  prompting the large language model to generate the contextual description of the data outlier based at least on:
    a first pre-defined measurement exception rule of the plurality of pre-defined measurement exception rules when the most probable corrective action corresponds to the first pre-defined measurement exception rule, and a second pre-defined measurement exception rule of the plurality of pre-defined measurement exception rules when the most probable corrective action corresponds to the second pre-defined measurement exception rule.

29. The computer-implemented method according to claim 18, wherein a respective reference artifact of the plurality of reference artifacts corresponds to a historical data outlier and includes:
   a set of measurement values observed during the historical data outlier,
   an identified cause of the historical data outlier, and
   a corrective action performed to resolve the historical data outlier associated with the physical asset.

30. A computer-implemented system comprising:
   one or more processors;
   a memory; and
   a computer-readable medium operably coupled to the one or more processors, the computer-readable medium having computer-readable instructions stored thereon that, when executed by the one or more processors, cause a computing device to perform operations comprising:
      receiving a machine-generated alert indicating a data outlier for a physical asset;
      obtaining, from a computer database, a dataset comprising observed data for the physical asset within a predefined temporal window of the machine-generated alert;
      generating, via a description generator, a contextual description of the data outlier based at least on the observed data for the physical asset;
      in response to generating the contextual description of the data outlier, searching an embedding-based knowledgebase that comprises a plurality of embedding representations corresponding to a plurality of reference artifacts for the physical asset, wherein searching the embedding-based knowledgebase includes:
         computing, via an embedding model, an embedding representation of the contextual description generated for the data outlier, and
         detecting a subset of embedding representations of the plurality of embedding representations within a similarity threshold of the embedding representation of the contextual description;
      obtaining, from the computer database, a subset of the plurality of reference artifacts that correspond to the subset of embedding representations; and
      generating, via a large language model, a resolution suggestion for resolving the data outlier based at least on the subset of reference artifacts obtained from the computer database.

* * * * *